US010732715B2

(12) United States Patent
Piao et al.

(10) Patent No.: US 10,732,715 B2
(45) Date of Patent: Aug. 4, 2020

(54) INPUT OUTPUT DEVICE AND VEHICLE COMPRISING THE SAME

(71) Applicant: LG Electronics Inc., Seoul (KR)

(72) Inventors: Jinhua Piao, Seoul (KR); Jiwon Oh, Seoul (KR); Eunjoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 16/026,705

(22) Filed: Jul. 3, 2018

(65) Prior Publication Data
US 2019/0212819 A1    Jul. 11, 2019

(30) Foreign Application Priority Data

Jan. 5, 2018 (KR) ........................ 10-2018-0001943

(51) Int. Cl.
*G06F 3/01* (2006.01)
*B60K 37/06* (2006.01)
(Continued)

(52) U.S. Cl.
CPC .............. *G06F 3/016* (2013.01); *B60K 35/00* (2013.01); *B60K 37/06* (2013.01); *G06F 3/041* (2013.01);
(Continued)

(58) Field of Classification Search
CPC .......... G06F 3/016; G06F 3/017; G06F 3/041; G06F 3/0481; G06F 3/04812; G06F 3/0482; G06F 3/0484; G06F 3/04842; G06F 3/04847–04855; G06F 3/0488; G06F 3/04886; G06F 3/1423–1438; G06K 9/00832–00845; B60K 35/00;
(Continued)

(56) References Cited

U.S. PATENT DOCUMENTS 8,587,546 B1 * 11/2013 El-Khoury ............ G06F 3/1431
345/173
9,064,663 B2 6/2015 Taka et al.
(Continued)

FOREIGN PATENT DOCUMENTS

KR       101422060      7/2014
KR     1020150079435    7/2015
(Continued)

OTHER PUBLICATIONS

Extended European Search Report in European Appln. No. 18215412.0, dated Mar. 6, 2019, 8 pages.

*Primary Examiner* — Nathan Danielsen
(74) *Attorney, Agent, or Firm* — Fish & Richardson P.C.

(57) ABSTRACT

The present disclosure relates to an input/output device mounted on a vehicle having a plurality of displays, and the input/output device may include a touch panel configured to sense a touch input, a haptic module configured to generate a tactile effect on the touch panel, a communication unit configured to perform communication with any one of the displays, and a processor configured to set one or more feedback regions on the touch panel based on a screen being displayed on the display, and control the haptic module to generate a tactile effect when a touch is applied to the one or more feedback regions, wherein the one or more feedback regions vary according to the screen being displayed on the display.

19 Claims, 25 Drawing Sheets

(51) Int. Cl.
*G06F 3/0488* (2013.01)
*B60K 35/00* (2006.01)
*G06F 3/041* (2006.01)
*G06F 3/14* (2006.01)
*G06K 9/00* (2006.01)

(52) U.S. Cl.
CPC ........ *G06F 3/04886* (2013.01); *G06F 3/1423* (2013.01); *B60K 2370/11* (2019.05); *B60K 2370/111* (2019.05); *B60K 2370/115* (2019.05); *B60K 2370/122* (2019.05); *B60K 2370/143* (2019.05); *B60K 2370/149* (2019.05); *B60K 2370/1438* (2019.05); *B60K 2370/158* (2019.05); *B60K 2370/184* (2019.05); *B60K 2370/191* (2019.05); *B60K 2370/21* (2019.05); *B60K 2370/52* (2019.05); *B60K 2370/73* (2019.05); *G06F 2203/04104* (2013.01); *G06K 9/00845* (2013.01)

(58) Field of Classification Search
CPC .. B60K 37/00–06; B60K 2370/11–115; B60K 2370/12; B60K 2370/122; B60K 2370/141–149; B60K 2370/15; B60K 2370/158; B60K 2370/184; B60K 2370/191; B60K 2370/21; B60K 2370/52; B60K 2370/73–744
See application file for complete search history.

(56) References Cited

U.S. PATENT DOCUMENTS

| | | | |
|---|---|---|---|
| 2009/0237364 A1 | 9/2009 | Bloomcamp et al. | |
| 2009/0250267 A1 | 10/2009 | Heubel et al. | |
| 2012/0215403 A1* | 8/2012 | Tengler | B60W 50/12 701/36 |
| 2014/0160050 A1* | 6/2014 | Olien | G06F 3/016 345/173 |
| 2015/0153951 A1* | 6/2015 | Kim | G06F 3/0414 715/773 |
| 2018/0046246 A1* | 2/2018 | Nishihashi | B60K 37/06 |

FOREIGN PATENT DOCUMENTS

| | | | |
|---|---|---|---|
| KR | 1020150084330 | 7/2015 | |
| KR | 1020160071092 | 6/2016 | |
| WO | WO-2016152047 A1 * | 9/2016 | ............ B60K 37/06 |
| WO | WO2016038675 | 4/2017 | |

* cited by examiner

INPUT OUTPUT DEVICE AND VEHICLE COMPRISING THE SAME

CROSS-REFERENCE TO RELATED APPLICATION

Pursuant to 35 U.S.C. § 119(a), this application claims the benefit of earlier filing date and right of priority to Korean Application No. 10-2018-0001943, filed on Jan. 5, 2018, the contents of which is incorporated by reference herein in its entirety.

BACKGROUND OF THE INVENTION

1. Field of the Invention

The present disclosure relates to an input/output device made at a boundary between a vehicle and a passenger to perform communication with each other and a vehicle including the same.

2. Description of the Related Art

A vehicle denotes a means of transporting people or goods using kinetic energy. Representative examples of vehicles include automobiles and motorcycles.

For safety and convenience of a user who uses the vehicle, various sensors and devices are provided in the vehicle, and the functions of the vehicle are diversified.

The function of the vehicle may be divided into a convenience function for promoting the convenience of a driver and a safety function for promoting the safety of a driver and/or a pedestrian.

First, the convenience function has a motive for development related to driver convenience, such as giving an infotainment (information+entertainment) function to the vehicle, supporting a partial autonomous driving function, or assisting the driver's vision such as night vision or blind spot. For example, the convenience function may include an active cruise control (ACC) function, a smart parking assist system (SPAS) function, a night vision (NV) function, a head up display (HUD) function, an around view monitor (AVM) function, and an adaptive headlight system (AHS) function, and the like.

The safety function is a technology for securing the safety of the driver and/or the safety of a pedestrian, and may include a lane departure warning system (LDWS) function, a lane keeping assist system (LKAS) function, an autonomous emergency braking (AEB) function, and the like.

As various functions related to the vehicle are provided, the driver has to input a user input through a user interface in order to use various functions. Due to the nature of the vehicle, the driver should be able to easily enter the user input while looking ahead so as not to interfere with the driving, and the development of a user interface capable of such an input is required.

SUMMARY OF THE INVENTION

The present disclosure is contrived to solve the foregoing problems and other problems.

An object of the present disclosure is to provide an input/output device capable of allowing a driver to quickly and conveniently execute a function desired to be carried out by the driver while looking ahead, and a vehicle including the same.

Another object of the present disclosure is to provide an input/output device capable of integrally controlling a plurality of displays provided in a vehicle, and a vehicle including the same. Moreover, still another object of the present disclosure is to provide an input/output device capable of allowing a driver to control a display located out of the reach of the driver's hand, and a vehicle including the same.

Yet still another object of the present disclosure is to provide an input/output device capable of allowing a plurality of passengers to control a display assigned to themselves using one input/output device and a vehicle including the same.

One embodiment of the present disclosure relates to an input/output device mounted on a vehicle having a plurality of displays.

An embodiment of the present disclosure relates to an input/output device mounted on a vehicle having a plurality of displays.

The input/output device may include a touch panel configured to sense a touch input; a haptic module configured to generate a tactile effect on the touch panel; a communication unit configured to perform communication with any one of the displays; and a processor configured to set one or more feedback regions on the touch panel based on a screen being displayed on the display, and control the haptic module to generate a tactile effect when a touch is applied to the one or more feedback regions, wherein the one or more feedback regions vary according to the screen being displayed on the display.

According to an embodiment, when a preset touch input is entered to any one of the feedback regions, the processor may control the communication unit to execute a predetermined function through the display by the preset touch input.

According to an embodiment, the predetermined function may vary according to a feedback region to which the preset touch input is entered.

According to an embodiment, when one or more graphic objects set to receive a user input are included in the screen, a feedback region corresponding to each graphic object may be set on the touch panel.

According to an embodiment, when the screen includes a first graphic object set to a first function and a second graphic object set to a second function, a first feedback region corresponding to the first graphic object and a second feedback region corresponding to the second graphic object may be set on the touch panel, and when the preset touch input is entered to the first feedback region, the processor may control the communication unit to execute the first function on the display.

According to an embodiment, when a touch other than the preset touch input is entered to the first feedback region, the processor may control the communication unit to display notification information indicating that the first graphic object has been selected on the display.

According to an embodiment, the position and size of each feedback region may vary according to the position and size of a graphic object corresponding to each feedback region being displayed on the display.

According to an embodiment, the processor may control the haptic module to generate a different tactile effect according to a feedback region to which a touch is applied on the entire region of the touch panel.

According to an embodiment, the processor may control the haptic module to restrictively generate a tactile effect in a feedback region to which a touch is applied on the entire region of the touch panel.

According to an embodiment, when a first feedback region and a second feedback region located apart from each other are included in the one or more feedback regions, the processor may control the haptic module to generate a tactile effect in the first feedback region in response to a touch being applied to the first feedback region, and control the haptic module to generate a tactile effect in the second feedback region in response to a touch being applied to the second feedback region.

According to an embodiment, the communication unit may receive an image that has captured a passenger of the vehicle from a camera provided in the vehicle, and the processor may select any one display looked at by the passenger among the displays using the image, and set the one or more feedback regions based on a screen being displayed on the selected display.

According to an embodiment, when a display looked at by the passenger is changed, the processor may reset the one or more feedback regions based on a screen being displayed on the changed display.

According to an embodiment, the processor may restrict the one or more feedback regions from being reset while a touch is applied to the touch panel.

According to an embodiment, the one or more feedback regions may be set on the touch panel based on a first screen when the passenger looks at a first display displaying the first screen, and the one or more feedback regions may be set on the touch panel based on a second screen when the passenger looks at a second display displaying the second screen.

According to an embodiment, when the passenger looks at the first display, the processor may control the communication unit to display guide information for guiding the selected display on the first screen.

According to an embodiment, when the passenger looks at the second display other than the first display, the processor may control the communication unit to display the guide information on the second screen while disappearing from the first screen.

According to an embodiment, when a plurality of passengers are on board the vehicle, the processor may select any one passenger applying a touch to the touch panel among the passengers, and the selected display may be a display looked at by the selected passenger among the passengers.

According to an embodiment, the touch panel may be configured with a touch screen, and a display of the touch screen may be selectively turned on or off according to a speed of the vehicle.

According to an embodiment, the touch screen may be divided into a first region and a second region, and the processor may turn on the display of the first region and turn off the display of the second region when the speed of the vehicle is within a reference range, and set the one or more feedback regions within the second region.

In addition, according to an embodiment of the present disclosure, there is provided a display device including at least part of the foregoing in the input/output device.

The display device may include a camera; a plurality of displays; a touch panel configured to sense a touch input; a haptic module configured to generate a tactile effect on the touch panel; and a processor configured to select any one of the displays based on an image received from the camera, and set one or more feedback regions on the touch panel based on a screen being displayed on the display, and control the haptic module to generate a tactile effect when a touch is applied to the one or more feedback regions, wherein the one or more feedback regions vary according to the screen being displayed on the display.

Furthermore, the present disclosure may be extended to a vehicle and/or a vehicle control method having the foregoing input/output device and/or display device.

The effects of a display device and a vehicle including the same according to the present disclosure will be described as follows.

The input/output device provides a user interface for controlling a plurality of displays provided in the vehicle. Even if it is a display located out of the reach of any passenger's hand, the relevant passenger may control the relevant display through the input/output device.

The input/output device may not directly provide visual information, but may provide a tactile effect to guide a function that can be executed by a passenger.

The passenger may enter a user input to a screen through the input/output device while looking at the screen being displayed on any one of a plurality of displays provided in the vehicle. This is because the input/output device mirrors a screen looked at by the passenger, and provides feedback regions in which graphics objects included in the screen are enlarged or reduced at a predetermined ratio, thereby allowing the passenger to quickly search for a specific graphic object to be touched.

Moreover, the passenger may simply look at a certain display for entering a user input, thereby quickly selecting a display to be controlled through the input/output device. Through this, integrated control over a plurality of displays is quickly and conveniently carried out.

Even when a plurality of passengers are on board, the input/output device may operate as an input/output device for identifying a user who inputs a touch and controlling a display viewed by the relevant user. In addition, the input/output device may also operate as an input/output device for a plurality of passengers at the same time. Since only one input/output device for a plurality of passengers needs to be mounted, a space inside the vehicle may be further secured.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
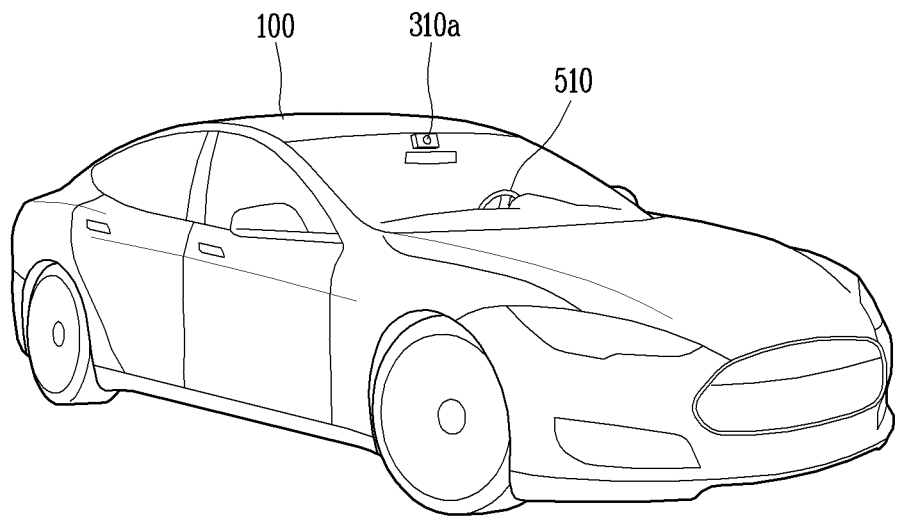
FIG. 1 is a view illustrating an appearance of a vehicle according to an embodiment of the present disclosure.
Figure 1:
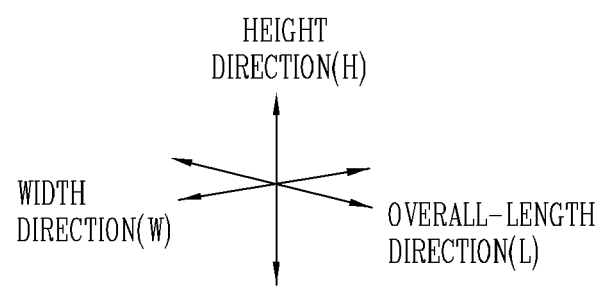

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
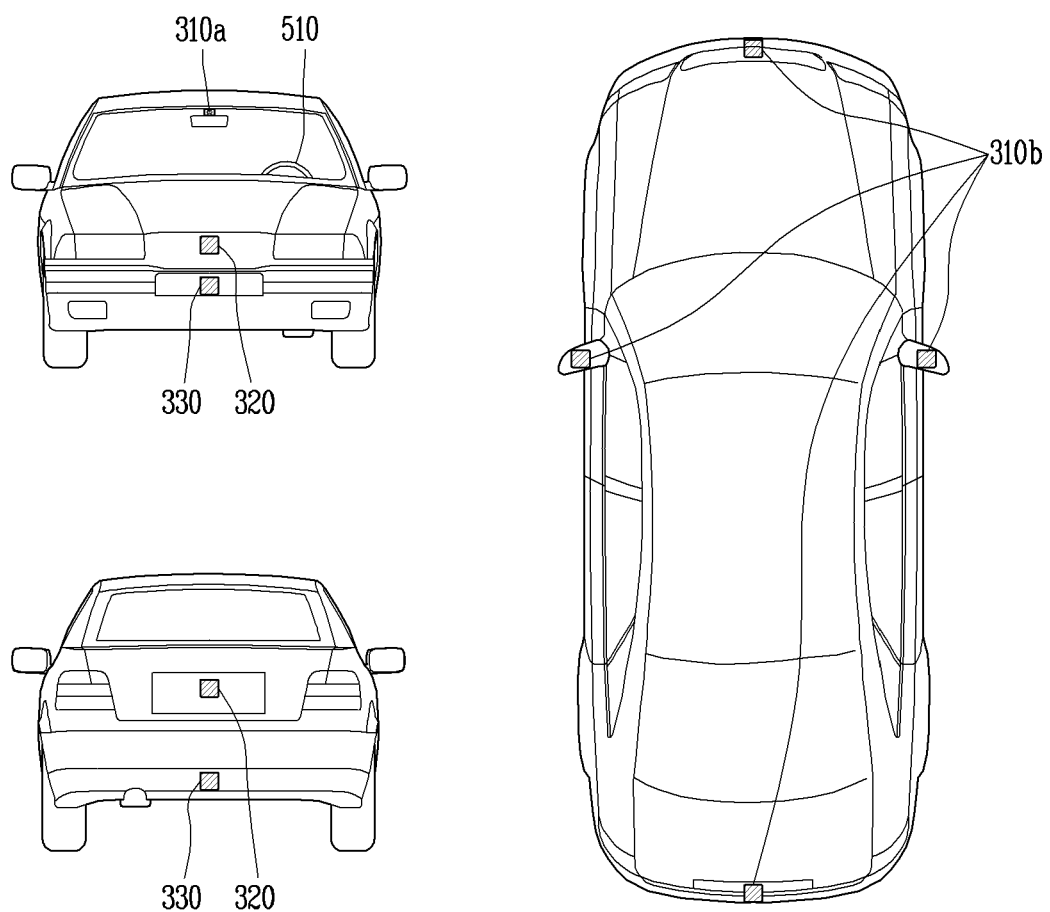
FIG. 2 is a view in which a vehicle according to an embodiment of the present disclosure is viewed at various angles from the outside.

FIG. 2 is a view in which a vehicle according to an embodiment of the present disclosure is viewed at various angles from the outside.

Figure 3:
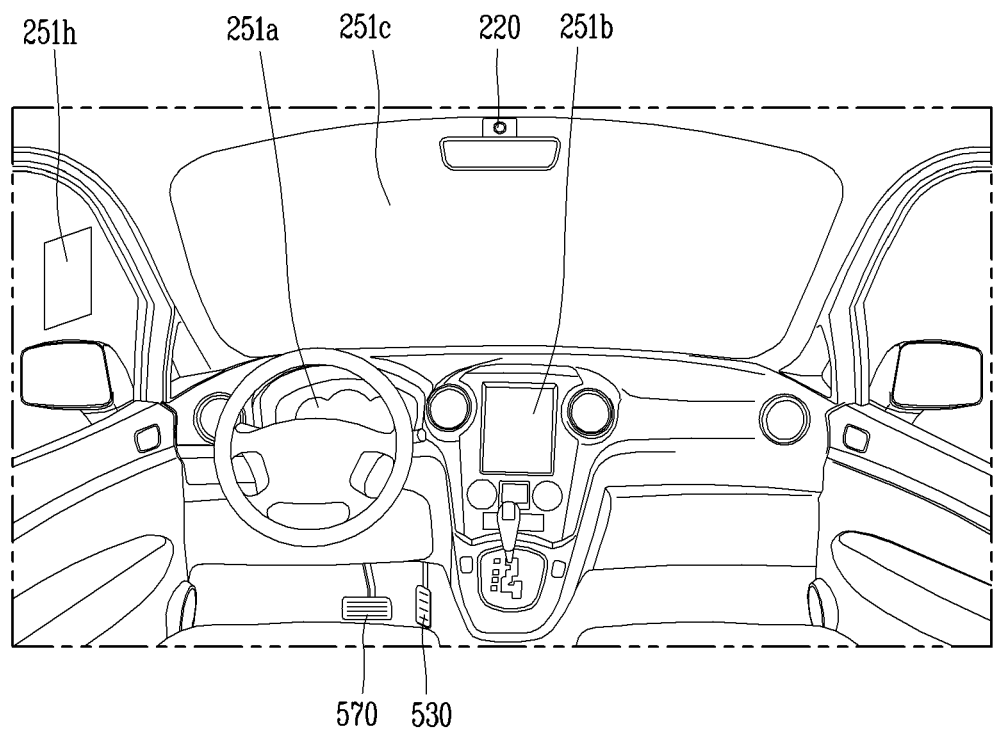
FIGS. 3 and 4 are views illustrating an inside of a vehicle according to an embodiment of the present disclosure.
Figure 4:
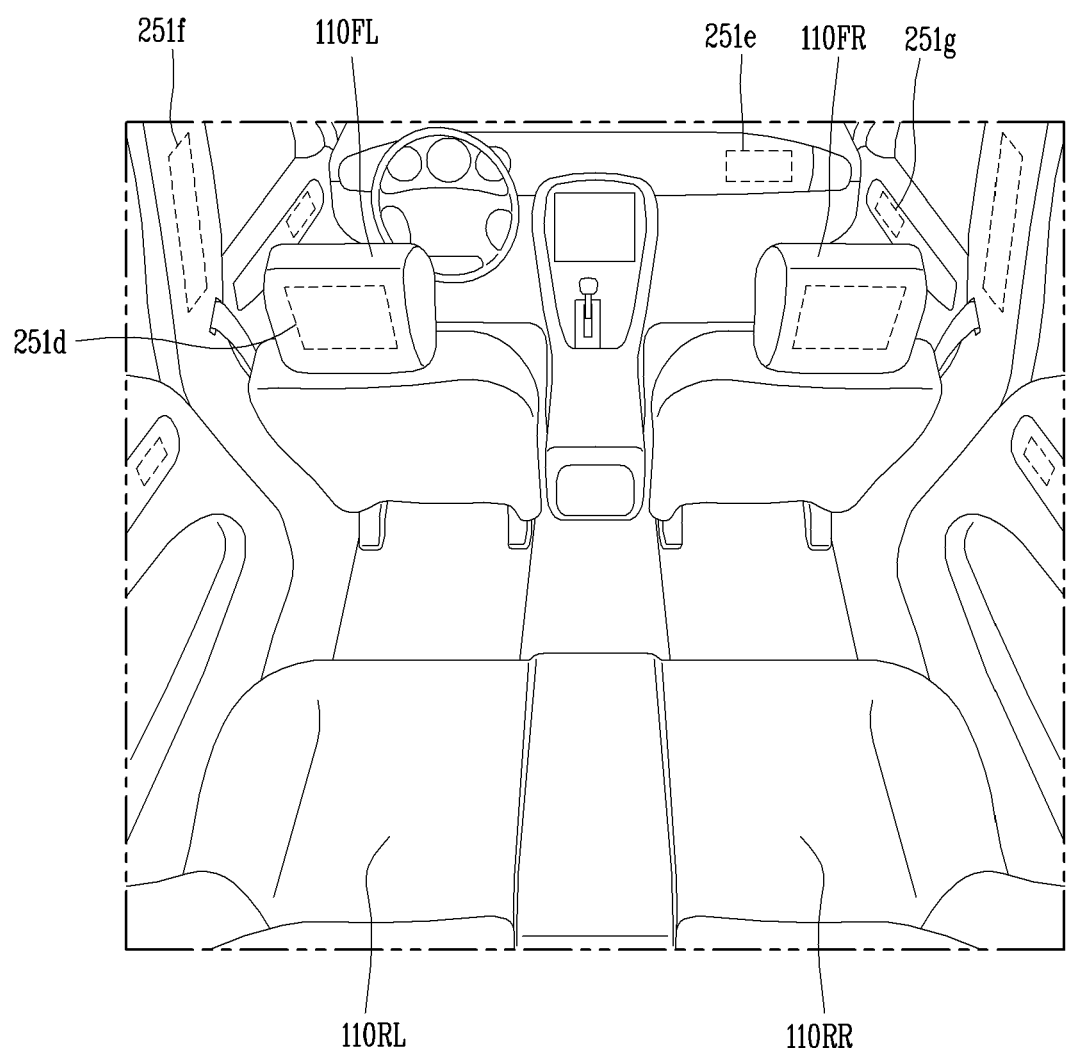

FIGS. 3 and 4 are views illustrating an inside of a vehicle according to an embodiment of the present disclosure.

Figure 5:
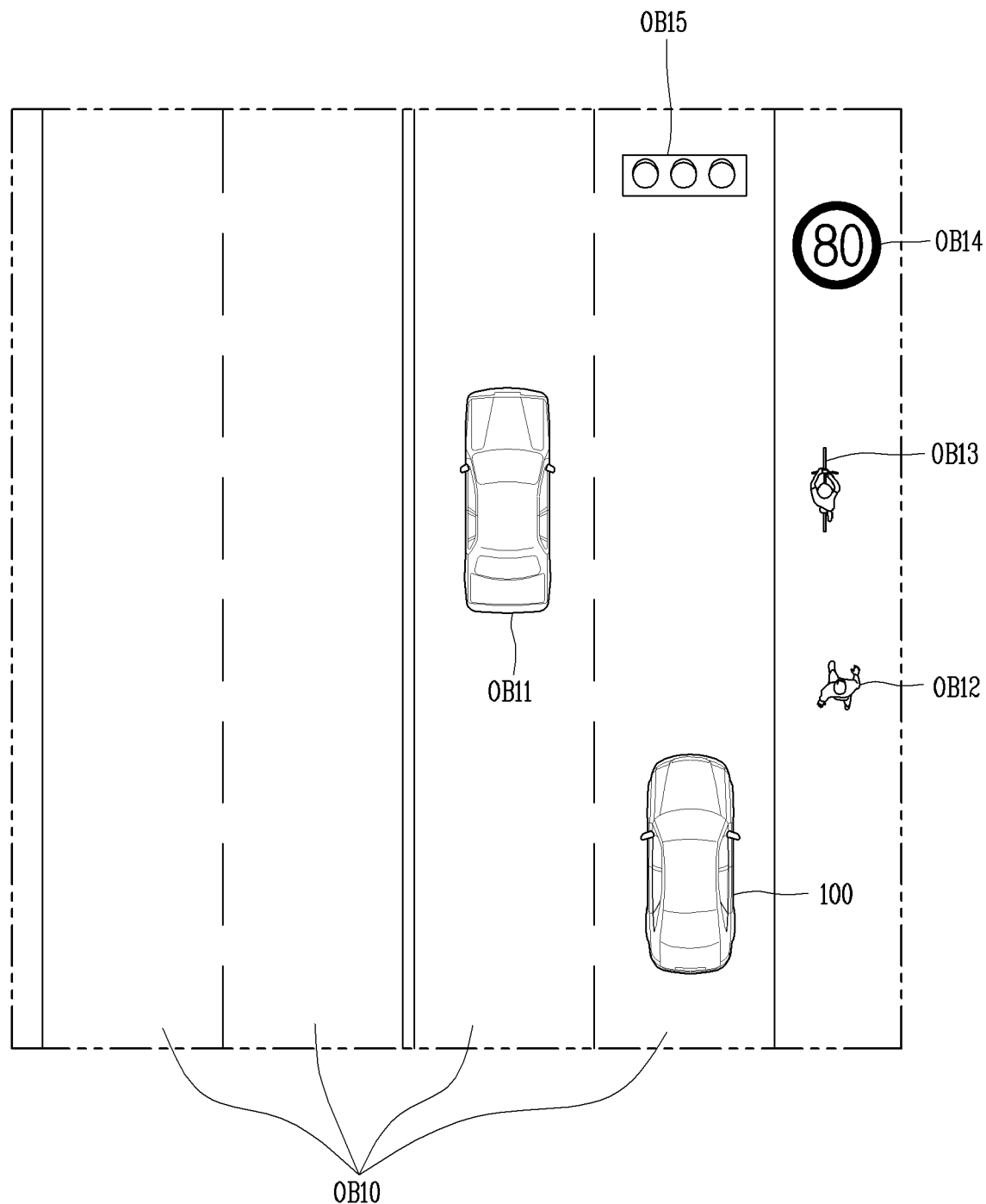
FIGS. 5 and 6 are views referenced to describe objects according to an embodiment of the present disclosure.
Figure 6:
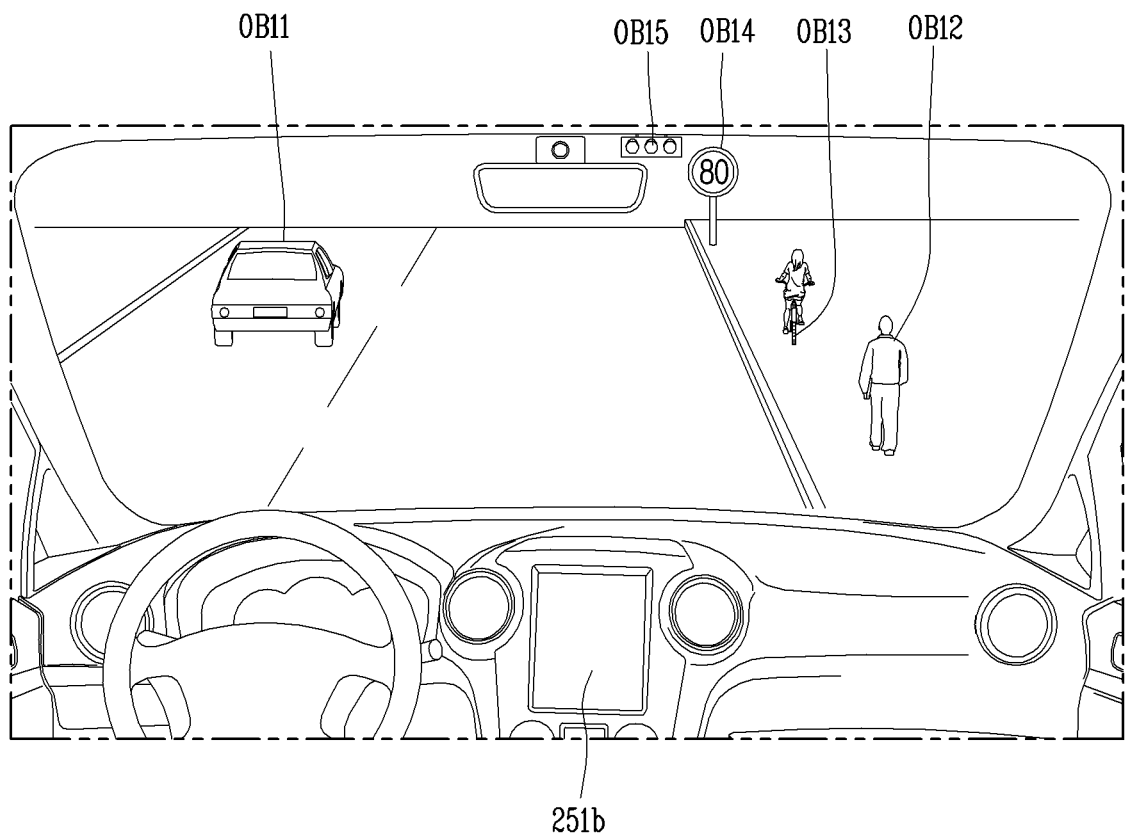

FIGS. 5 and 6 are views referenced to describe objects according to an embodiment of the present disclosure.

Figure 7:
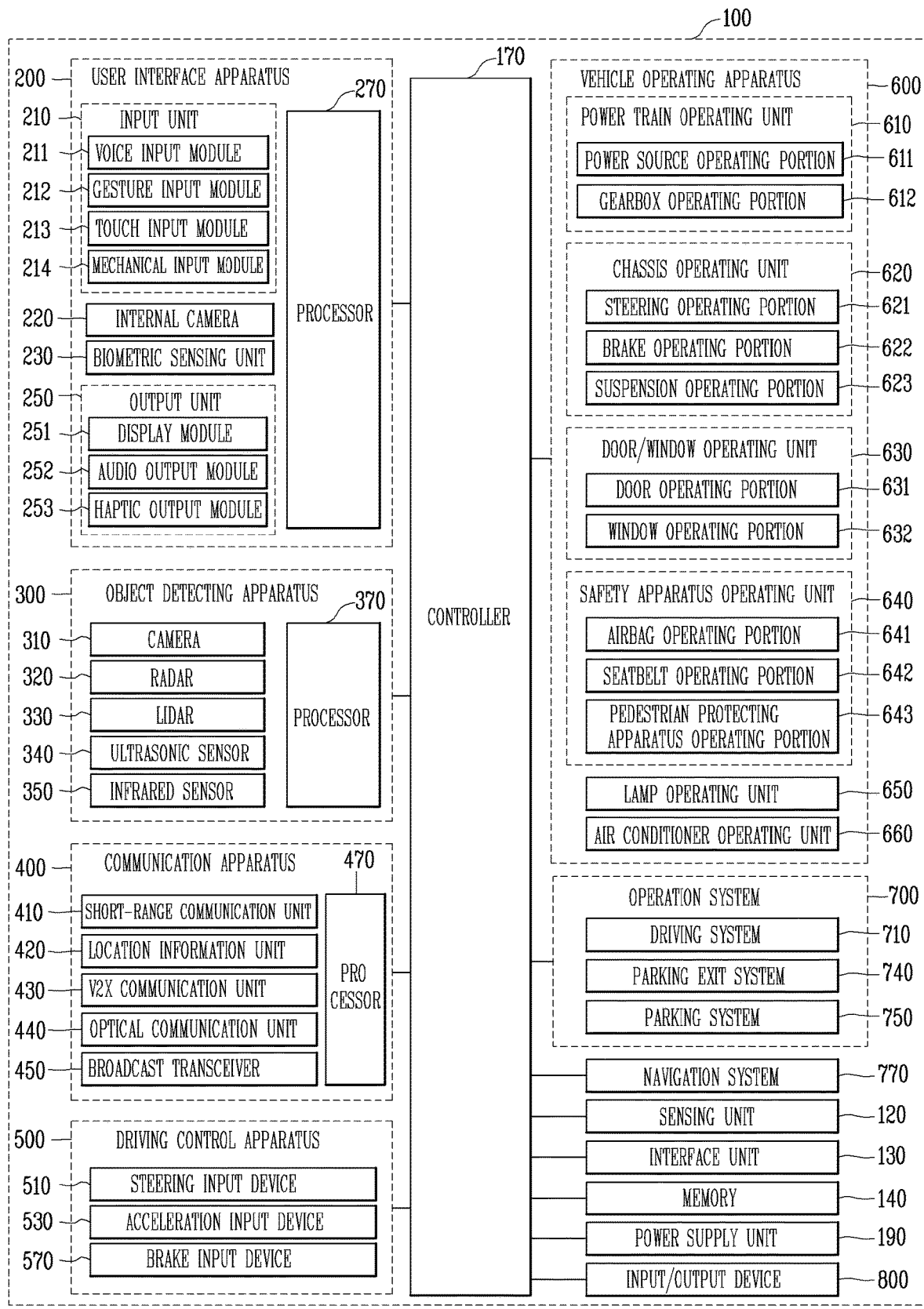
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

Here, autonomous driving is defined as controlling at least one of acceleration, deceleration, and driving direction based on a predetermined algorithm. In other words, it denotes that a driving operation device is automatically operated even if no user input is entered to the driving operation device.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon.

The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels.

For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a "wireless communication unit".

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an input/output device 800 included in the vehicle 100 will be described in detail.

Figure 8:
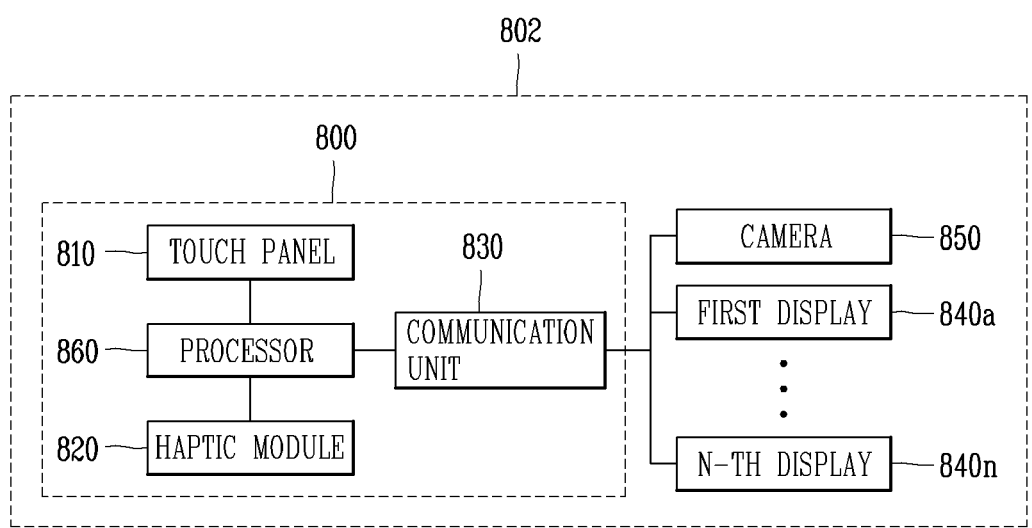
FIG. 8 is a block diagram for explaining an input/output device and a display device according to an embodiment of the present disclosure.

FIG. 8 is a block diagram for explaining an input/output device and a display device according to an embodiment of the present disclosure.

The input/output device 800 is defined as a device that provides an input and/or output for providing a user interface between at least one display among a plurality of displays provided in the vehicle 100 and a passenger on board the vehicle 100.

The input/output device 800 is provided in the vehicle 100, and may be an independent device that can be attached to or detached from the vehicle 100, or may be a part of the vehicle 100 integrally installed into the vehicle 100. The input/output device 800 may refer to the user interface device 200 described above with reference to FIG. 7.

Hereinafter, for the sake of convenience of explanation, the input/output device 800 will be described as a separate component that is independently formed from the user interface device 200 of the vehicle 100. However, this is only an embodiment of the present disclosure, and all the operation and control method of the input/output device 800 described herein may be carried out by the controller 170 of the vehicle 100. In other words, the operation and/or control method performed by the processor 860 of the input/output device 800 may also be performed by the controller 170 of the vehicle 100.

Referring to FIG. 8, the input/output device 800 includes a touch panel 810, a haptic module 820, a communication unit 830, and a processor 860.

The touch panel 810 has a single surface, and is configured to sense a proximity touch and/or a contact touch.

An action of recognizing an object to be positioned in proximity on the touch panel 810 without being in contact with the touch panel 810 is referred to as a "proximity touch," and an action of allowing an object to be actually in contact with the touch panel 810 is referred to as a "contact touch."

The position at which a proximity touch is made on the touch panel 810 denotes a position where the object corresponds vertically to the touch panel 810 when the proximity touch is made thereon. The touch panel 810 senses a proximity touch and a proximity touch pattern (for example, a proximity touch distance, a proximity touch direction, a proximity touch speed, proximity touch time, a proximity touch position, a proximity touch movement state, and the like).

The touch panel 810 senses a touch (or touch input) applied to the touch panel 810 using at least one of various touch methods including a resistive film method, a capacitive method, an infrared method, an ultrasonic method, a magnetic field method, and the like.

For an example, the touch panel 810 may be configured to convert a change of pressure applied to or a capacitance generated at a specific portion of the touch panel 810 into an electrical input signal. The touch panel 810 may be configured to detect a position, an area, a pressure at the time of touch, a capacitance at the time of touch, and the like, of a touch object applying a touch to the touch panel 810 to be touched on the touch panel 810. Here, the touch object as an object applying a touch to the touch sensor, may include a finger, a touch pen, a stylus pen, a pointer, or the like, for example.

As described above, when there is a touch input to the touch panel 810, a signal (or signals) corresponding thereto may be sent to a touch controller. The touch controller processes the signal(s), and then transmits the corresponding data to the processor 860. Accordingly, the processor 860 may sense which region of the display unit 810 has been touched. Here, the touch controller may be a component separated from the processor 860 or the processor 860 itself.

The processor 860 may perform different controls or perform the same control according to the type of the touch object applying a touch to the touch panel 810. Whether to perform different controls or the same control according to the type of the touch object may be determined based on the current operating state of the vehicle 100 or an application program currently being executed.

On the other hand, various types of touches, such as a short (or tap) touch, a long touch, a multi-touch, a drag touch, a flick touch, a pinch-in touch, a pinch-out touch, a swipe touch, a hovering touch, and the like, to the touch panel 810 may be sensed.

The haptic module 820 generates various haptic effects that the user can feel. A typical example of the haptic effect that is generated by the haptic module 820 is vibration. The strength, pattern and the like of the vibration generated by the haptic module 820 may be controlled by the user's selection or setting of the controller. For example, the haptic module 820 may output different vibrations in a combined or sequential manner.

Besides vibration, the haptic module 820 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 820 can also be implemented to allow the user to feel a tactile effect through a muscle sensation such as the user's fingers or arm, as well as transferring the tactile effect through direct contact. Two or more haptic modules 820 may be provided according to the configuration of the input/output device 800.

The haptic module 820 may be configured to have a limited haptic effect only in at least one region of the touch panel 810 determined by the processor 860 within the entire region of the touch panel 810. For example, according to the control of the processor 860, a tactile effect may be generated in the entire region of the touch panel 810, or a tactile effect may be generated in a partial region of the touch panel 810. When the tactile effect is generated in the partial region, the tactile effect may not be generated in the remaining region other than the partial region. In other words, the haptic module 820 may operate so that the tactile effect is generated in a restrictive manner only to the partial region.

The communication unit 830 is configured to perform communication with the various components described in FIG. 7. For an example, the communication unit 850 may receive various information provided through a controller area network (CAN). In another example, the communication unit 850 may perform communication with all communicable devices, such as a vehicle, a mobile terminal and a server, and other vehicles. This may be named V2X (Vehicle to everything) communication. V2X communication may be defined as a technology that exchanges information such as traffic situation while communicating with road infrastructure and other vehicles while driving.

The communication unit 830 may receive information related to the driving of the vehicle from most of the devices provided in the vehicle 100. The information transmitted from the vehicle 100 to the input/output device 800 is referred to as "vehicle driving information."

The vehicle driving information includes vehicle information and surrounding information of the vehicle. The information related to the inside of the vehicle with respect to the frame of the vehicle 100 may be defined as vehicle information, and the information related with the outside of the vehicle may be defined as surrounding information.

Vehicle information denotes information on the vehicle itself. For example, the vehicle information may include at least one of a driving speed of the vehicle, a driving direction, an acceleration, an angular speed, a position (GPS), a weight, a number of vehicle occupants, a braking force of the vehicle, a maximum braking force of the vehicle, an air pressure of each wheel, a centrifugal force applied to the vehicle, a driving mode of the vehicle (whether it is an autonomous driving mode or a manual driving mode), a parking mode of the vehicle (autonomous parking mode, automatic parking mode, manual parking mode), whether or not a user is on board the vehicle, information related to the user, and the like.

The surrounding information denotes information relate to another object located within a predetermined range around the vehicle and information related to the outside of the vehicle. The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

In addition, the surrounding information may include an ambient brightness, a temperature, a sun position, surrounding object information (a person, a vehicle, a sign, etc.), a type of road surface during driving, a geographic feature, line information, driving lane Information, and information required for autonomous driving/autonomous parking/automatic parking/manual parking mode.

Furthermore, the surrounding information may further include a distance from an object existing around the vehicle to the vehicle 100, a collision probability, a type of the object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

The communication unit 830 may communicate with at least one of a plurality of displays provided in the vehicle 100. For example, when a touch is applied to the touch panel 810, a message may be transmitted to the at least one display to execute a function corresponding thereto through at least one of the plurality of displays.

The communication unit 830 may perform communication with the displays in a wired or wireless manner. The communication unit 830 may be a wire itself connecting the displays to the processor 860 in a wired manner.

Although not shown in the drawing, the input/output device 800 may further include a memory.

The memory (not shown) may store a program for the operation of the processor 860 and temporarily store input/output data (e.g., vehicle driving information, etc.). Data with regard to various patterns of vibration and sound that are output when an touch input is applied to the touch screen may be stored in the memory 440.

The memory may include at least one type of storage media, such as a flash memory type, a hard disk type, a solid state disk (SDD) type, a silicon disk drive (SDD) type, a multimedia card micro type, a card type memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The input/output device 800 may operate in association with a web storage performing a storage function of the memory over the Internet.

The processor 860 may select at least one of the displays mounted on vehicle 100. For example, any one of the displays may be selected based on a gaze of the driver on board the vehicle 100, selected based on a pointed end of the driver's hand, or selected based on various types of user inputs. For another example, any one of the plurality of displays provided in the vehicle 100 may be selected by default.

The processor 860 sets one or more feedback regions on the touch panel 810 based on a screen displayed on the selected display. At least one of the number, position, size, and shape of the one or more feedback regions varies according to the screen being displayed on the selected display.

Here, the feedback region denotes a region where a tactile effect is generated when a touch is applied thereto. It is contrasted with a region where a tactile effect is not generated when a touch is applied to the region which is not set as the feedback region.

Moreover, the feedback region performs the role of a virtual key for the selected display.

For example, when two graphic objects are displayed on the selected display (or when two graphic objects are included in a screen displayed on the selected display), feedback regions corresponding to the two graphic objects are set on the touch panel 810. A first feedback region is set to correspond to the first graphic object configured to execute a first function, and a second feedback region is set to correspond to the second graphic object configured to execute the second function. When a user desires to execute the first function, the user may touch the first graphic object or enter a preset touch input in the first feedback region.

Graphic objects are extracted from a screen displayed on the selected display, and the extracted graphic objects are copied to the feedback regions and formed in the input/output device 800. The passenger may be provided with the same effect as using the feedback regions to apply a touch to the graphic objects. It is contrasted with a mirroring technology in that the screen is not copied as it is.

The driver may control a plurality of displays provided in the vehicle 100 using the input/output device 800. The input/output device 800 provides a user interface for any one display selected from a plurality of displays provided in the vehicle 100. In other words, the touch panel 810 of the input/output device 800 operates as a user input unit for the selected display.

The selected display may display a screen including one or more graphic objects configured to receive a user input. The passenger may enter a touch to any one graphic object to execute a predetermined function set to the any one graphic object. For example, a first function may be executed when a touch is applied to the first graphic object, and a second function may be executed when a touch is applied to the second graphic object.

However, in order for the driver to execute the first function, there is a problem that a display displaying the first graphic object must be viewed by driver to apply a touch to the first graphic object. It is because the driver must look at the display other than the road to touch the first graphic object, even though the driver should look at the road ahead while driving. When the driver applies a touch to a display far away from himself or herself, a time for looking at the display is increased as far away therefrom. When a touch is input to a display with one hand while holding the steering wheel with the other hand, a concentration level of driving is also reduced. As a plurality of displays re provided in the vehicle 100, there is a problem of increasing the risk of operation while increasing the convenience of the driver.

The input/output device 800 according to the present disclosure is to solve the above-mentioned problem, and generates an effect of allowing the driver to directly touch a predetermined graphic object by touching the touch panel 810. In other words, the feedback region performs the role of a virtual key for the selected display.

Since the input/output device 800 does not have a separate display, the processor 860 provides a tactile effect using a haptic module to guide the driver to apply a touch to an accurate position.

The driver may search for a virtual key (or a feedback region) of a function he or she wants to use based on a tactile effect provided by the input/output device 800. For example, a first tactile effect may be generated when a touch is applied to the first feedback region, and a second tactile effect different from the first tactile effect may be generated when a touch is applied to the second feedback region. Since the tactile effect is used, the driver may search for a virtual key he or she wants to use with one hand while his or her gaze is fixed in the forward direction.

When the search is completed, a preset touch input may be applied to the virtual key to execute a function set to the virtual key.

The processor 860 sets a feedback region based on a screen displayed on the selected display because different screens are displayed for each display, and the position, size, and shape of the graphic objects included in each screen are different. When the screen displayed on the selected display is changed from a first screen to a second screen, the feedback region set with respect to the first screen is reset with respect to the second screen.

The operation of the input/output device associated with the feedback region will be described below with reference to the accompanying drawings.

Meanwhile, the input/output device 800 may be extended to a display device 802. The display device 802 may further include at least one of "n" displays 840a-840n and a camera 850 that are spaced apart from each other while including the input/output device 800 as it is. Here, "n" denotes a natural number.

The touch panel 810 may have a mutual layer structure with any one of the displays included in the display device 802 or may be integrally formed to implement a touch screen.

The camera 850 is configured to capture a passenger boarding the inside of the vehicle 100, and may be composed of one or more cameras. The camera 850 may refer to the internal camera 220 described above in FIG. 7.

Hereinafter, for the sake of convenience of explanation, embodiments of the present disclosure will be described with reference to the input/output device 800, for example, but the present disclosure is not limited thereto. In other words, the embodiments of the input/output device 800 described below may be extended and applied to the display device 802.

Figure 9:
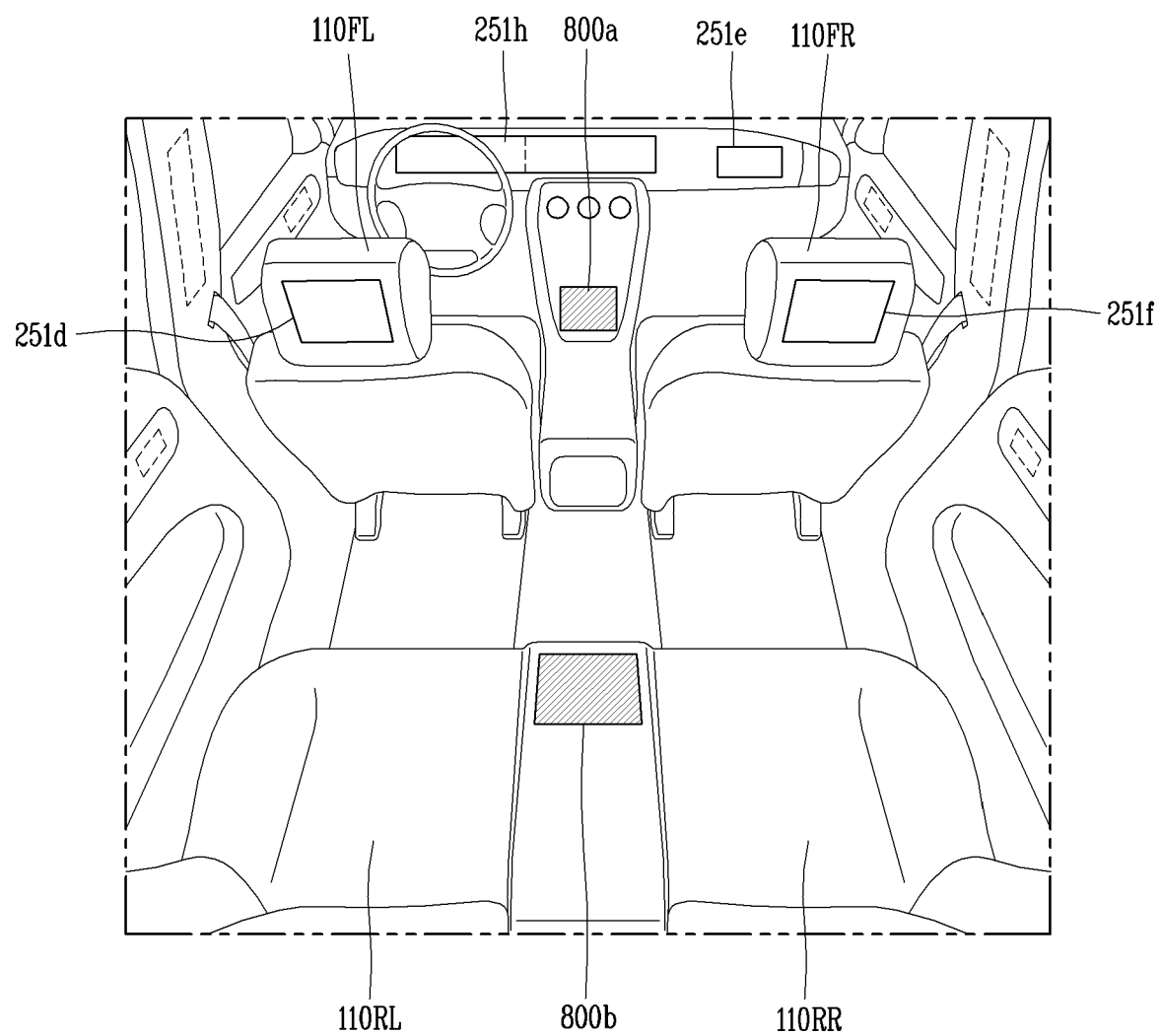
FIG. 9 is an exemplary view for explaining a mounting position of an input/output device according to an embodiment of the present disclosure.

FIG. 9 is an exemplary view for explaining a mounting position of an input/output device according to an embodiment of the present disclosure.

A plurality of displays provided in the vehicle 100 may be classified into a first group and a second group depending on the mounted position on the assumption that the vehicle 100 is a sedan. Specifically, displays located in the front with respect to the driver's seat 110FL of the vehicle 100 may be classified into the first group, and displays located in the rear may be classified into the second group.

The first group is defined as a display used by a passenger aboard the driver's seat 110FL and the front passenger seat 110FR, and the second group may be defined as a display used by a passenger aboard the rear seats 110RL and 110RR.

For example, as illustrated in FIG. 9, the first group may include a dashboard display 251h coupled with a dashboard display and a center fascia display, and a front passenger seat display 251e. The dashboard display 251h may be separated into a dashboard display and a center fascia display that are spaced apart from each other.

The second group may include a first rear seat display 251*d* mounted on the driver's seat 110FL and a second rear seat display 251*h* mounted on the front passenger seat 110FR.

The input/output device 800 may include a first input/output device 800*a* configured to control a display included in the first group and a second input/output device 800*b* configured to control a display included in the second group.

The first input/output device 800*a* is located between the driver's seat and the front passenger seat, and is located at a center fascia where the dashboard and the shift lever meet vertically, or located between the center console and the center fascia. With this arrangement, the driver may input a touch to the first input/output device 800*a* by moving a finger after placing an elbow on the center console, and may quickly return a hand to the handle when an emergency situation occurs.

The second input/output device 800*b* may be disposed between the rear seats 110RL and 110RR. Alternatively, it may be disposed on a center armrest corresponding to an armrest between the rear seats 110RL and 110RR.

Figure 10:
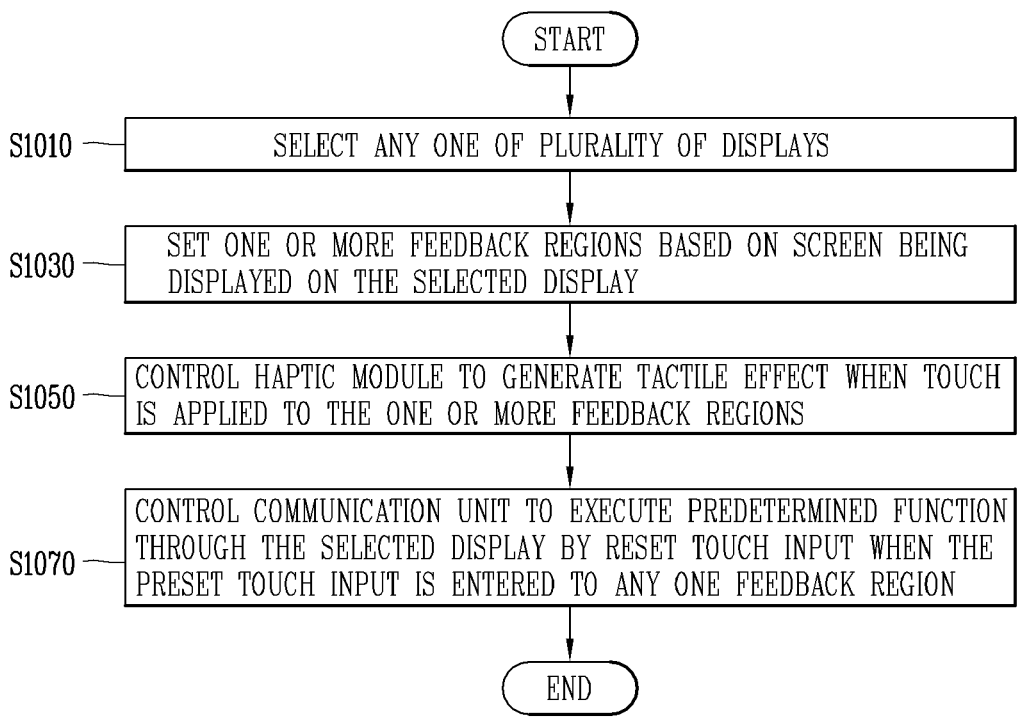
FIG. 10 is a flowchart for explaining a control method of an input/output device according to an embodiment of the present disclosure.
Figure 11A:
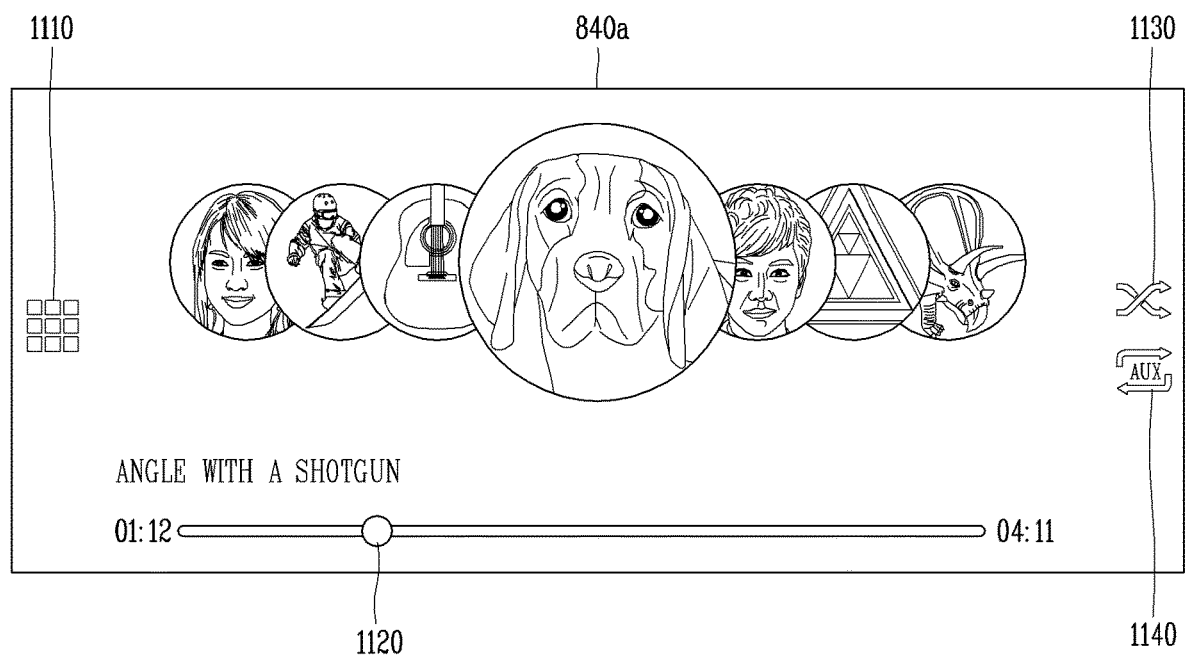
FIGS. 11A and 11B are exemplary views for explaining the operation of an input/output device according to the control method of FIG. 10.
Figure 11A:
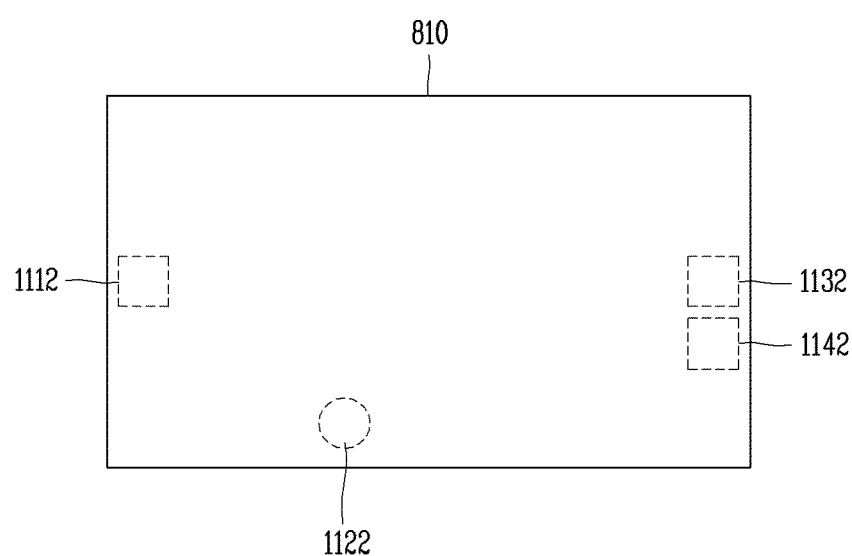
Figure 11B:
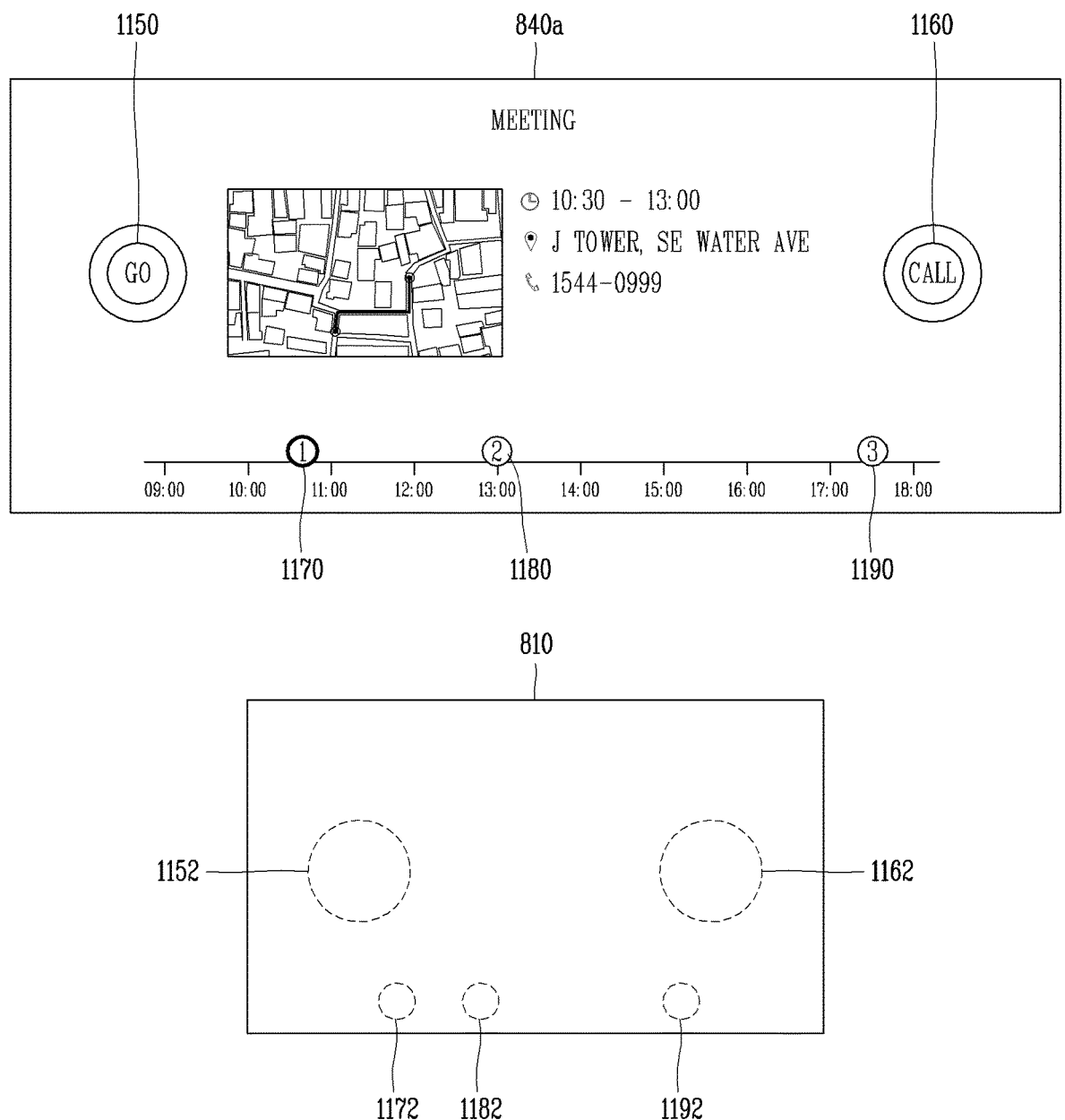
Figure 12A:
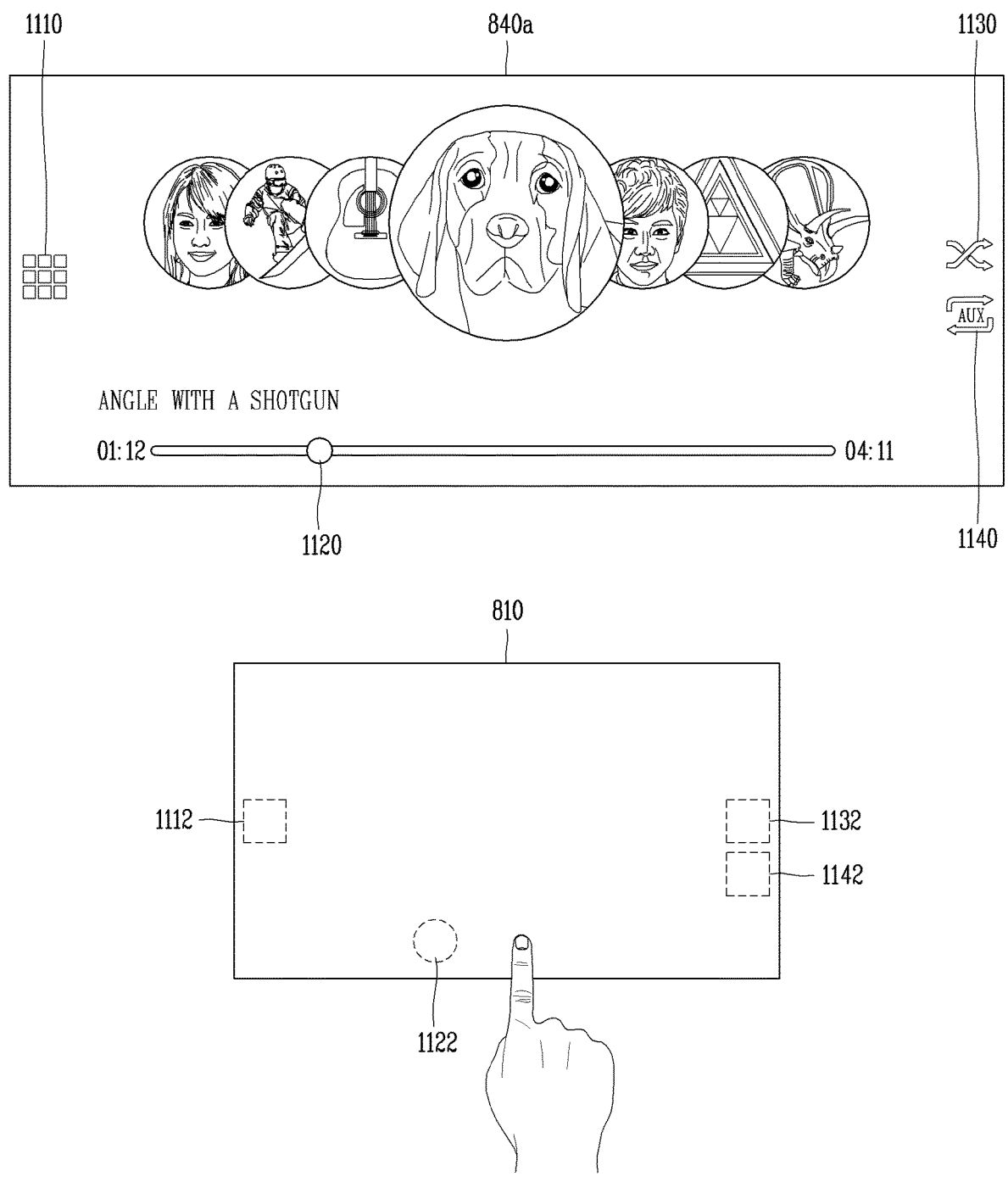
FIGS. 12A through 12C are exemplary views for explaining the operation of an input/output device according to a touch applied thereto.
Figure 12B:
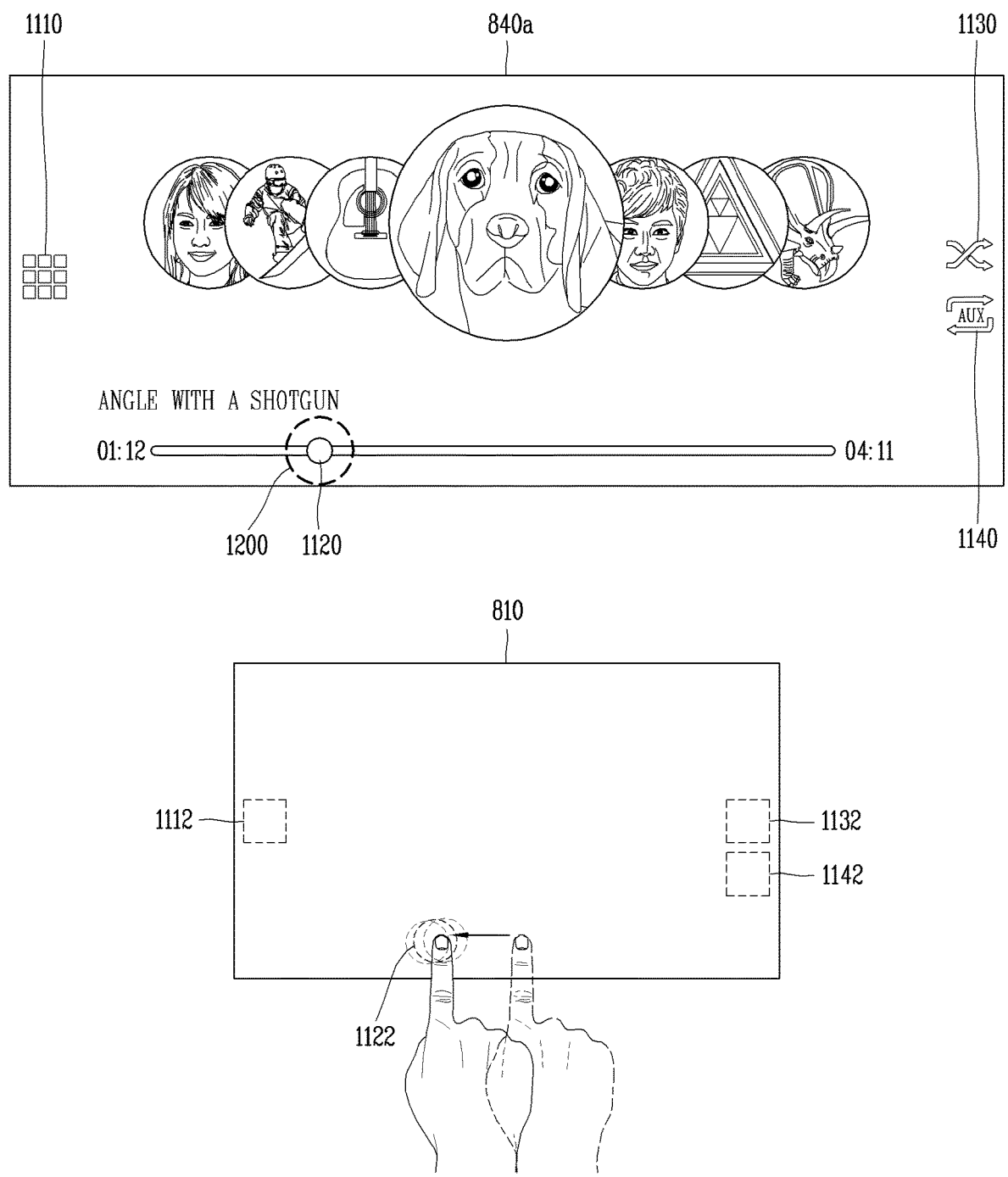
Figure 12C:
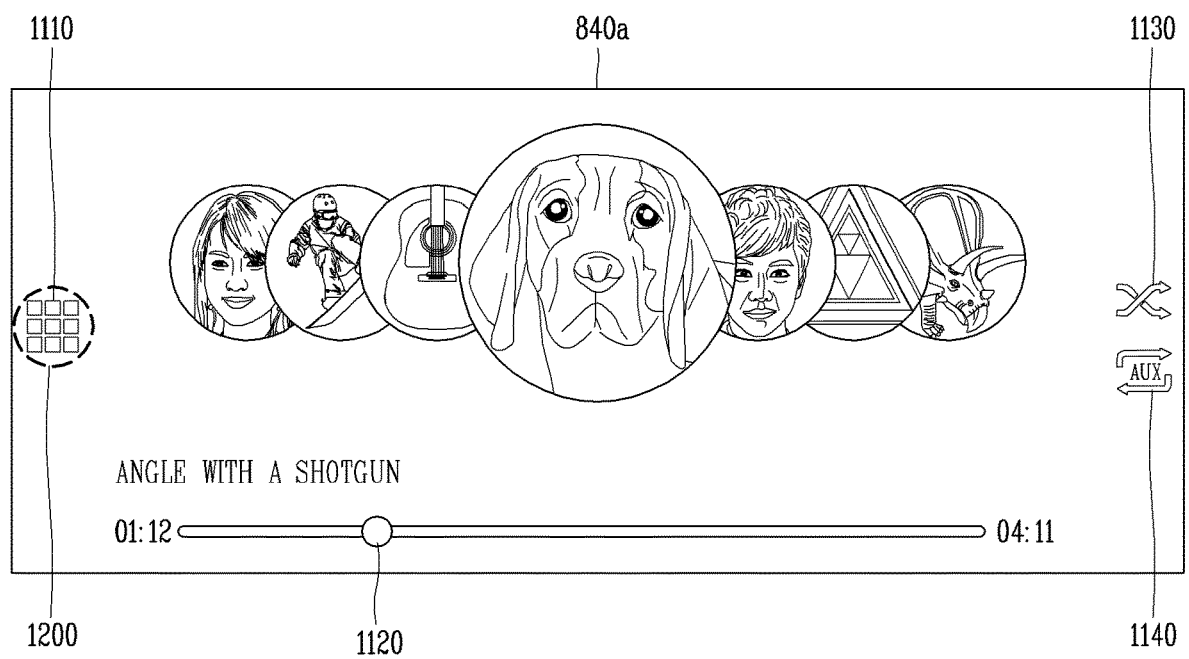
Figure 12C:
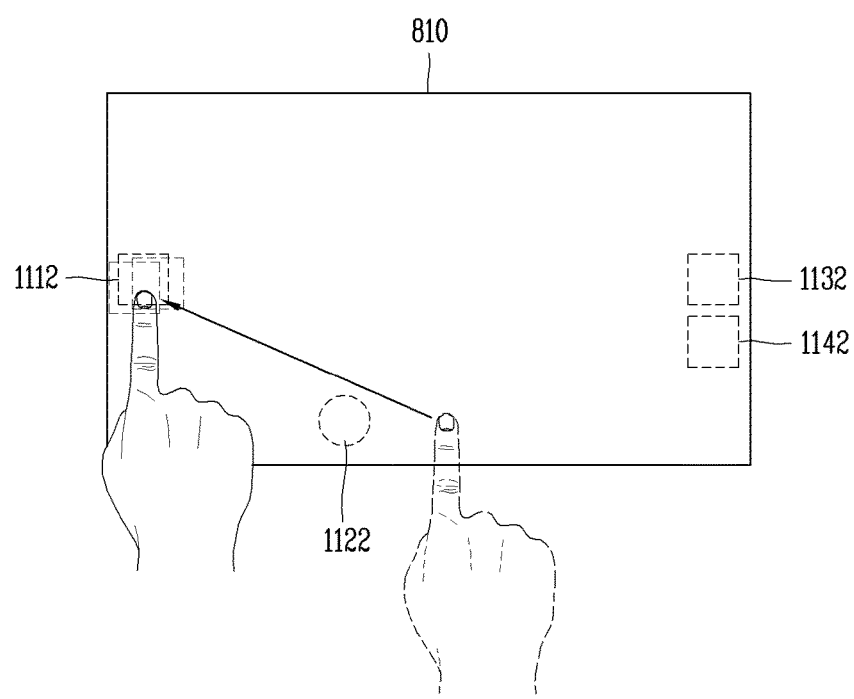

FIG. 10 is a flowchart for explaining a control method of an input/output device according to an embodiment of the present disclosure, and FIGS. 11A and 11B are exemplary views for explaining the operation of an input/output device according to the control method of FIG. 10. Furthermore, FIGS. 12A through 12C are exemplary views for explaining the operation of an input/output device according to a touch applied thereto.

Referring to FIG. 10, the processor 860 selects one of the plurality of displays provided in the vehicle 100 (S1010). It is to set a feedback region of the touch panel 810 based on the selected display.

When the vehicle 100 is turned on, the process of selecting any one display may be omitted, and the any one display may be previously set. For example, the center fascia display located at the center fascia of the vehicle 100 may be previously set to the any one display.

The processor 860 may receive an image that has captured a passenger of the vehicle 100 from a camera 850 provided in the vehicle 100. The processor 860 may select any one display being looked at by the passenger among the displays using the image. In other words, any one display looked at by the passenger may be selected through eye tracking. The state in which the any one display is selected may be maintained until the passenger looks at another display.

Next, the processor 860 sets one or more feedback regions based on a screen displayed on the selected display (S1030).

The processor 860 may perform communication with the selected display through the communication unit 830, and check a screen displayed on the selected display. The processor 860 sets one or more feedback regions based on information received from the selected display.

When one or more graphic objects set to receive a user input are included in the screen, a feedback region corresponding to each graphic object is set on the touch panel 810.

For example, as illustrated in FIG. 11A, when a first display 840*a* displayed with a first screen is selected, one or more feedback regions are set based on the first screen. The first screen may include a home button 1110, a playback point button 1120 for guiding a playback point of content being played back on the progress bar while at the same time changing the playback point, a playback mode change button 1130 for guiding a current playback mode such as random playback or sequential playback while at the same time changing the playback mode, and a repeat playback button 1140 for turning on or off repeat playback. In other words, the first screen may include four graphic objects.

In this case, the processor 810 may set four feedback regions corresponding to the four graphic objects on the touch panel 810. More specifically, when the screen includes a first graphic object set to a first function and a second graphic object set to a second function, a first feedback region corresponding to the first graphic object and a second feedback region corresponding to the second graphic object may be set on the touch panel.

At least one of the position, size, and shape of each feedback region varies according to the position, size, and shape of a graphic object corresponding to each feedback region being displayed in the selected display.

Specifically, a screen displayed on the selected display is reduced or enlarged at a predetermined ratio according to the size of the touch panel 810, and then a portion corresponding to the graphic object is extracted from the screen, and the extracted portion is set to a feedback region. For example, as illustrated in FIG. 11A, a first feedback region 1112 is set based on the home button 1110, and the first feedback region 1112 has a rectangular shape similar to the home button 1110, and formed at a position adjacent to the left end of the touch panel 810.

As the content is played back on the first display 840*a*, the playback point button 1120 moves from left to right. A second feedback region 1122 is also reset as the playback point button 1120 moves, and the second feedback region 1122 also moves on the touch panel 810.

A third feedback region 1132 corresponding to the playback mode change button 1130 and a fourth feedback region 1142 corresponding to the repeat playback button 1140 are displayed on the touch panel 810 based on the first screen displayed on the first display 840*a*.

For another example, as illustrated in FIG. 11B, when a second screen is displayed on the first display 840*a*, one or more feedback regions are displayed on the touch panel 810 based on the second screen.

The second screen may be an execution screen of a schedule management application of the driver on board the vehicle 100. When there are three schedules today, schedule guide icons 1170, 1180, 1190 for guiding each schedule may be included in the second screen. Detailed information about any one of the schedules 1170 may be included in the second screen, and a destination setting button 1150 for setting a point included in the schedule 1170 as a destination, and a call button 1160 for executing a call to a phone number included in the schedule 1170 may be included in the second screen.

A total of five feedback regions 1152, 1162, 1172, 1182, 1192 may be set on the touch panel 810 based on the second screen. The shape, size, and position of each feedback region are determined by each graphic object.

As described above, the number of feedback regions and the position, size, and shape of each feedback region set on the touch panel 810 may vary according to a screen displayed on the selected display.

Next, the haptic module is controlled to generate a tactile effect when a touch is applied to the one or more feedback regions (S1050).

The processor 860 controls the haptic module 820 to restrictively generate a tactile effect in a feedback region to which a touch is applied on the entire region of the touch panel 810.

When the first feedback region and the second feedback region located apart from each other are included in the one or more feedback regions, the processor 860 controls the haptic module 820 to generate a tactile effect in the first feedback region in response to a touch being applied to the first feedback region, and controls the haptic module 820 to generate a tactile effect in the second feedback region in response to a touch being applied to the second feedback region.

For example, referring to FIG. 12A, when it is desired to change the playback point of the content being played back, the passenger may apply a touch to the playback point button 1120 displayed on the first display 840*a* to change the playback point.

On the other hand, the passenger may select the first display 840*a* by looking at the first display 840*a*, and apply a touch one point on the touch panel 810 in consideration of the position of the playback point button 1120.

Since the passenger applies a touch to an arbitrary point on the touch panel 810, the passenger may apply a touch to a wrong position other than the second feedback region 1122. When a touch is applied to a region other than the feedback region, the touch panel 810 does not generate a tactile effect, and thus the passenger may recognize that the touch position is wrong.

The passenger may search for the second feedback region 1122 by moving a touch on the touch panel 810. As illustrated in FIG. 12B, when the touch moves to the second feedback region 1122, a tactile effect such as vibration occurs in the second feedback region 1122.

At the same time, the processor 860 may control the communication unit 830 to display notification information 1200 indicating that the playback point button 1120 is selected by a touch applied to the second feedback region 1122 on the first display 840*a*.

The passenger may check a tactile effect transmitted to a finger and which graphic object is selected by himself or herself through the notification information 1200 displayed on the first display 840*a*.

The processor 860 may control the haptic module 820 to restrictively generate a different tactile effect according to a feedback region to which a touch is applied on the entire region of the touch panel 810. For example, a first tactile effect may be generated when a touch is applied to the first feedback region, and a second tactile effect different from the first tactile effect may be generated when a touch is applied to the second feedback region. This is to allow the passenger to distinguish a feedback region to which the passenger has applied a touch.

The passenger may distinguish the position and type of the feedback region according to a tactile effect without visually checking the arrangement of the feedback regions. It is because feedback of inherent vibration and sound is provided for each feedback region when a passenger touches the touch panel 810 using a finger or a palm.

Next, when a preset touch input is input to any one of the feedback regions, the communication unit is controlled to execute a predetermined function through the selected display by the preset touch input (S1070).

When a simple touch is applied, a tactile effect is generated, but when a preset touch input is input, a predetermined function corresponding to the touch input is executed through the selected display.

The predetermined function may vary according to a feedback region to which the preset touch input is entered.

Moreover, when there are a plurality of preset touch inputs, different functions may be carried out according to the entered touch input.

For example, as illustrated in FIG. 12B, when a preset touch input is applied to the second feedback region 1122, a function set to the playback point button 1120 is carried out. When a force touch is applied to the second feedback region 1122, playback is temporarily stopped, and when a drag input for dragging and dropping the second feedback region 1122 is applied, the playback point is changed.

For another example, as illustrated in FIG. 12C, when a preset touch input is applied to the first feedback region 1112, a function set to the home button 1120 is carried out. When a force touch is applied to the first feedback region 1112, a home screen is displayed on the first display 840*a*, and when a double touch is applied, an execution screen of a recently executed application is displayed on the first display 840*a*.

When a change is made to a screen displayed on the first display 840*a* according to the execution of the function, the feedback regions set on the touch panel 810 are also reset.

As described above, the input/output device 800 provides a user interface capable of controlling a plurality of displays provided in the vehicle 100. Even when it is a display located out of the reach of any passenger's hand, the relevant passenger may control the relevant display through the input/output device 800.

The input/output device 800 may not directly provide visual information, but may provide a tactile effect to guide a function that can be executed by a passenger.

Figure 13A:
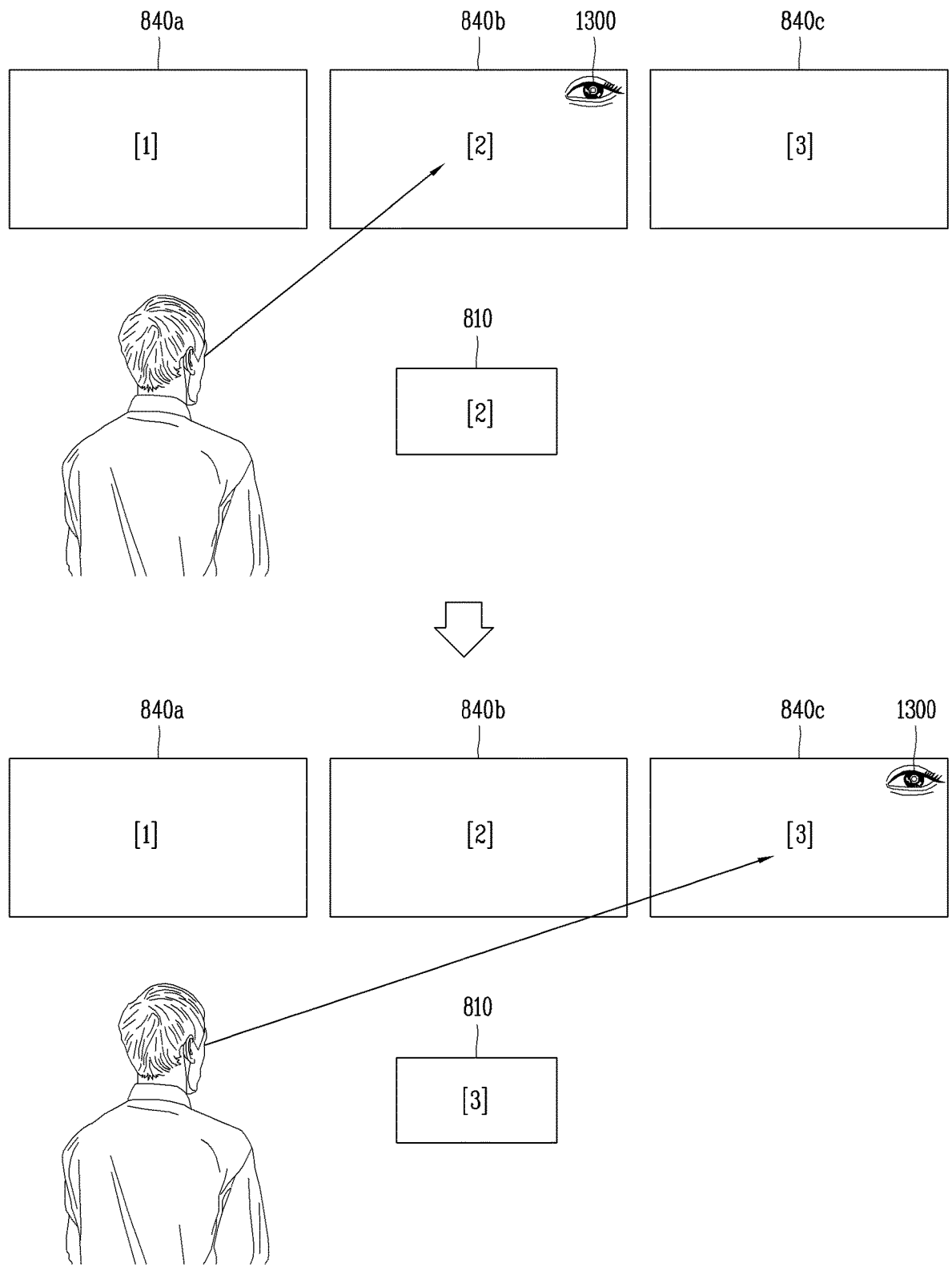
FIGS. 13A and 13B are exemplary views for explaining the operation of an input/output device for controlling any one of a plurality of displays.
Figure 13B:
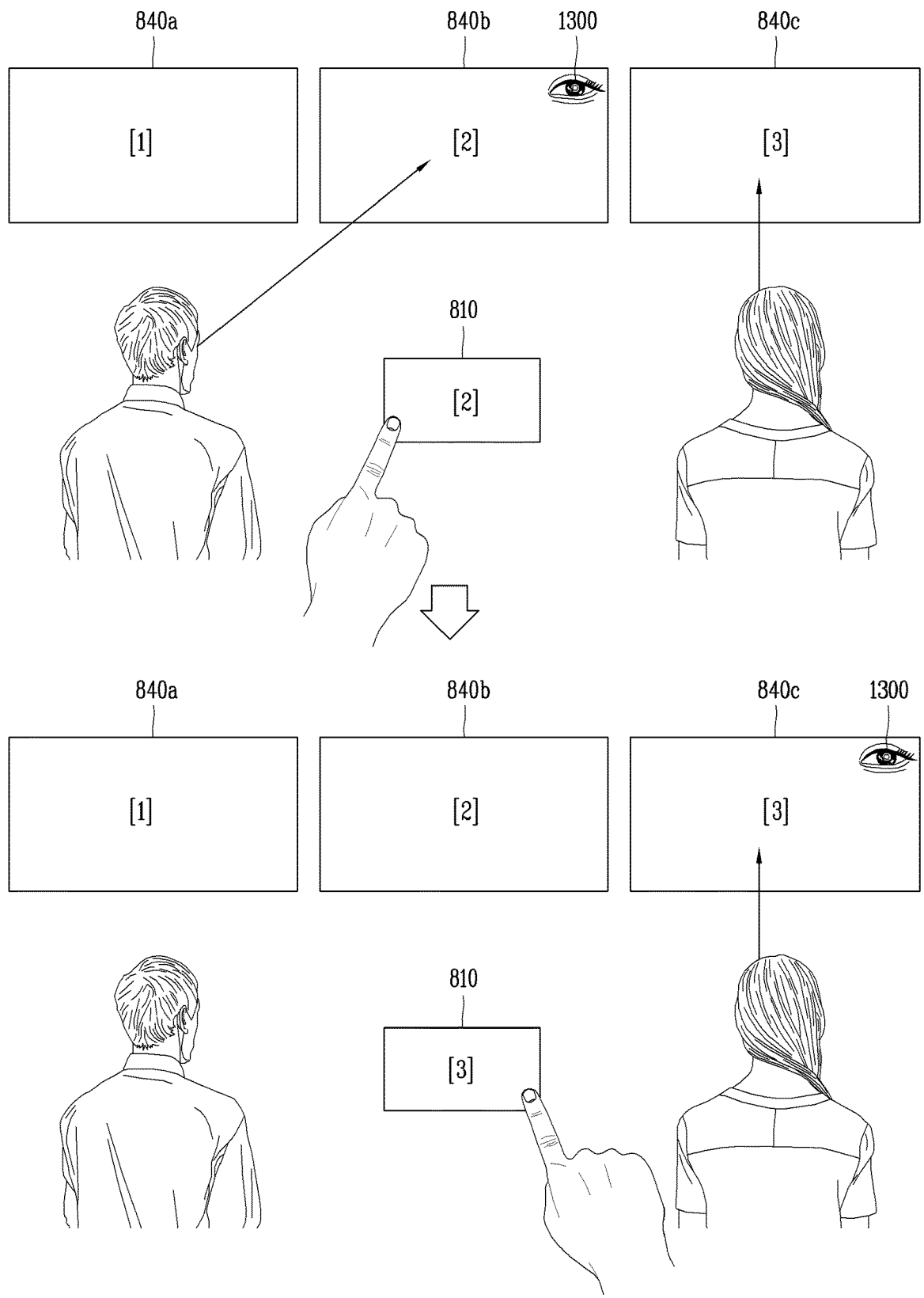

FIGS. 13A and 13B are exemplary views for explaining the operation of an input/output device for controlling any one of a plurality of displays.

The input/output device 800 may select any one of the plurality of displays 840*a*-840*c* included in the vehicle 100, which is looked at by the passenger. Then, one or more feedback regions may be set on the touch panel 810 based on a screen displayed on the selected display.

When the passenger looks at the first display 840*a* that displays a first screen, the one or more feedback regions are set on the touch panel 810 based on the first screen, and when the passenger looks at the second display 840*b* that displays a second screen, the one or more feedback regions are set on the touch panel 810 based on the second screen.

When a display looked at by the passenger is changed, the processor 860 resets the one or more feedback regions based on a screen displayed on the changed display.

For example, as illustrated in FIG. 13A, when the driver looks at the second display 840*b*, the processor 860 sets a feedback region based on a screen displayed on the second display 840*b*. Then, when the driver looks at the third display 840*c*, the processor 860 resets a feedback region based on a screen displayed on the third display 840*c*.

However, the processor 860 restricts the one or more feedback regions from being reset while a touch is applied to the touch panel 810. In other words, when in a situation that a touch is applied to the touch panel 810, the selected display is not changed to another display even when the passenger looks at another display. This is because a user input for the previously selected display is being received.

The processor 860 may control the communication unit 830 to display guide information for guiding which display is set based on a feedback region set on the touch panel 810 on at least one display.

The guide information may be information for guiding which display is selected and whether or not a touch is applied to the touch panel 810.

For example, as illustrated in FIG. 13A, when a feedback region is set based on the second display 840b, the guide information 1300 is displayed on the second screen displayed on the second display 840b.

The guide information 1300 may be a different image depending on whether or not a touch is applied to the touch panel 810. For example, when a touch is not applied, an image is formed of an eye-shaped image in the sense that the display is selected. However, when a touch is applied, the image may be changed to a finger-shaped image in the sense that the touch is applied.

The guide information 1300 may move from the second display 840b to the third display 840c when the feedback region is set based on the third display 840c. When the passenger looks at the third display 840c other than the second display 840b, the processor 860 controls the communication unit 830 to display the guide information 1300 on the third display 840c while disappearing from the second display 840b.

Meanwhile, the input/output device 800 may be shared by a plurality of passengers.

The processor 860 may track in real time which display is looked at by the plurality of passengers, respectively. The processor 860 may determine a display looked at by each passenger using an image that has captured the inside of the vehicle 100.

Moreover, the processor 860 may select any one of the passengers applying a touch to the touch panel 810. The processor 860 may select any one of the passengers applying a touch to the touch panel 810 through various methods such as using the image or using a fingerprint input to the touch panel 810.

The processor 860 may set a feedback region on the touch panel 810 based on a display looked at by the selected passenger.

For example, as illustrated in FIG. 13B, a first passenger may look at the second display 840b and a second passenger may look at the third display 840c. In this case, the processor 860 may prepare both a feedback region based on the second display 840b and a feedback region based on the third display 840c.

In this state, when the first passenger applies a touch to the touch panel 810, the processor 860 sets a feedback region based on the second display 840b, and controls the communication unit 830 to display the guide information 1300 on the second display 840b.

On the contrary, when the second passenger applies a touch to the touch panel 810, the processor 860 sets a feedback region based on the third display 840c, and controls the communication unit 830 to display the guide information 1300 on the third display 840c.

According to the present disclosure, since a plurality of passengers can control their own displays using one input/output device 800, it may be possible to secure not only a cost reduction effect but also a larger internal space of the vehicle 100.

FIGS. 14A through 14D are conceptual views for explaining various embodiments for setting a feedback region according to a screen being displayed on a display.

Figure 14A:
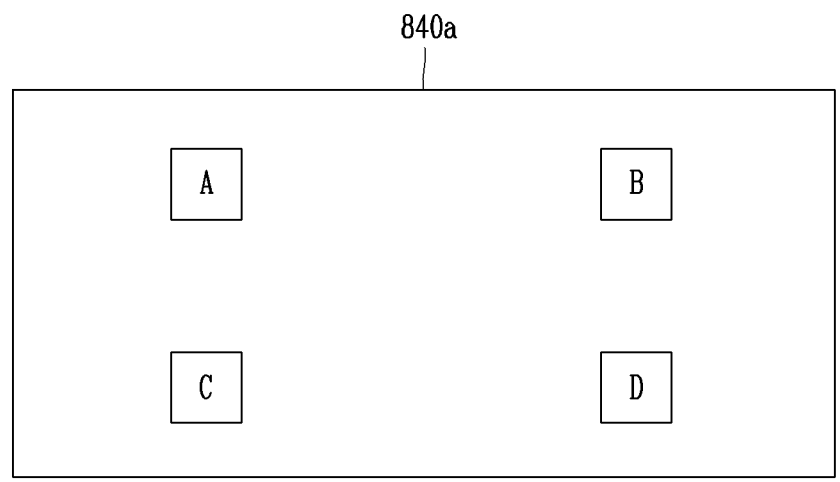
FIGS. 14A through 14D are conceptual views for explaining various embodiments for setting a feedback region according to a screen being displayed on a display.
Figure 14B:
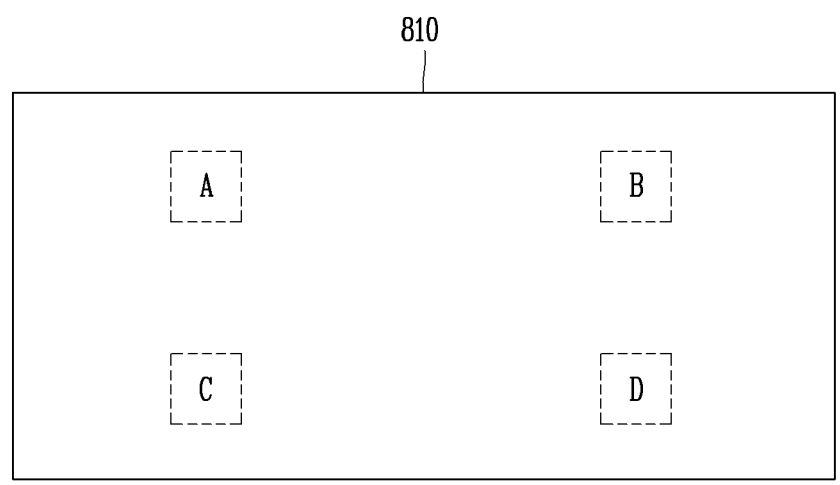
Figure 14C:
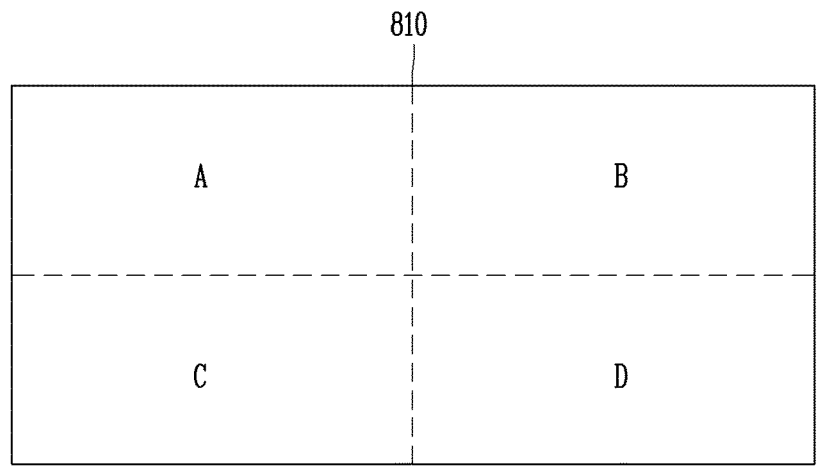

As illustrated in FIG. 14A, how feedback regions are set on the touch panel 810 in a state where four graphic objects are displayed on the first display 840a will be described in detail with reference to FIGS. 14B through 14D.

According to an embodiment, the processor 860 may reduce or enlarge graphic objects displayed on the first display 840a to a predetermined ratio according to the size of the touch panel 810, and then set feedback regions in one-to-one matching. As illustrated in FIG. 14B, when the first display 840a and the touch panel 810 have the same size, each graphic object is copied to the same shape and position as if mirrored to form a feedback region.

In this case, the passenger may intuitively search for a graphic object (or a feedback region corresponding thereto) to be used by himself or herself on the touch panel 810 while looking at the first display 840a.

Meanwhile, the processor 860 may divide the touch panel 810 by a number of graphic objects displayed on the first display 840a based on the number. As illustrated in FIG. 14C, since the number of the graphic objects is four, the touch panel 810 may be divided into four. At this time, the processor 860 may divide the entire region of the touch panel 810 by the number, thereby inducing the passenger to quickly search for any one graphic object.

In the case of an even division, there is a problem that a longer time is required for the passenger to search for a feedback region when a touch is applied to the center point of another feedback region or an edge of the touch panel 810.

For a method of solving the above problem, there is a method in which the processor 860 sets feedback regions as an even division prior to applying a touch, and then resets the feedback regions based on a point to which the touch is applied subsequent to applying the touch.

Figure 14D:
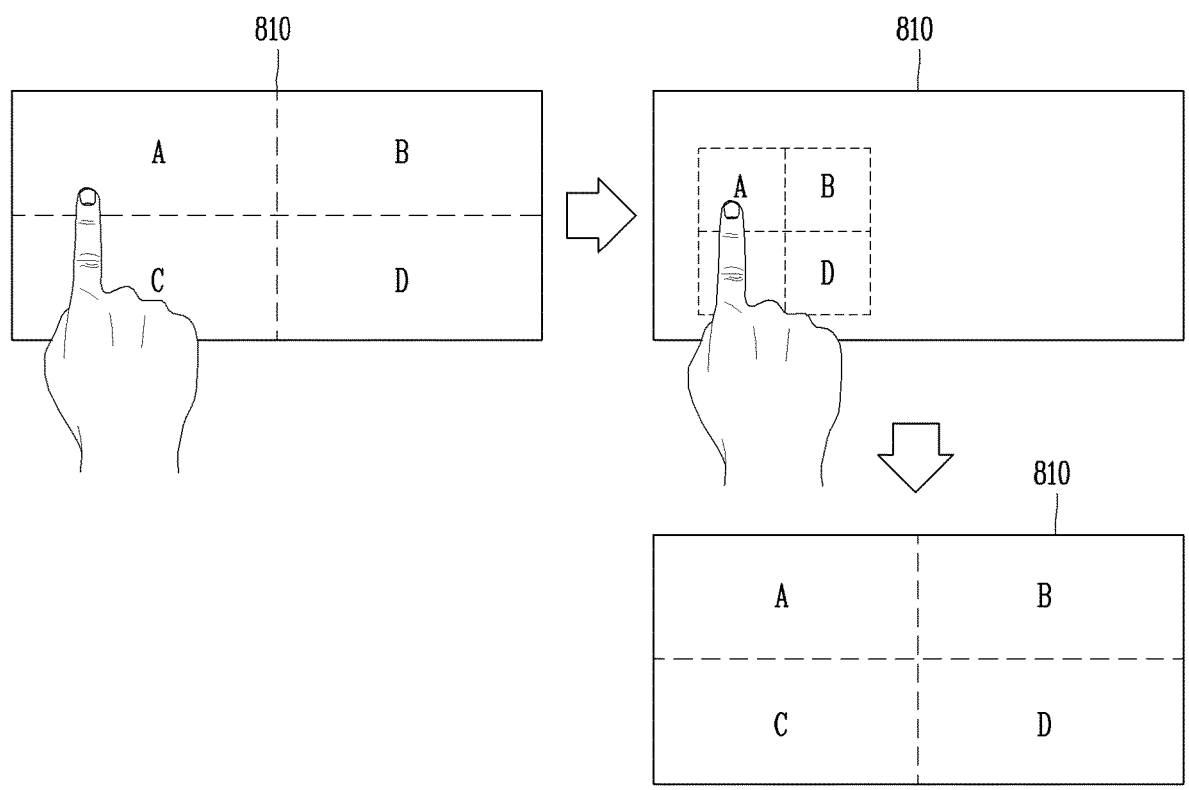

As illustrated in FIG. 14D, since the number of graphic objects displayed on the first display 840a is four, the touch panel 810 may be divided into four. Then, when a touch is applied to the first feedback region (A), the feedback regions are reset based on a point to which the touch is applied. At this time, the previously set feedback regions (the quadrant) may be reset in a direction of being reduced in size while being maintained in shape (quadrant). Since the size of the reset feedback regions is smaller than the related art, the passenger may quickly search for another feedback region.

When a touch is released while the feedback regions are reset, the reset feedback regions are returned to an evenly divided state again.

Figure 15:
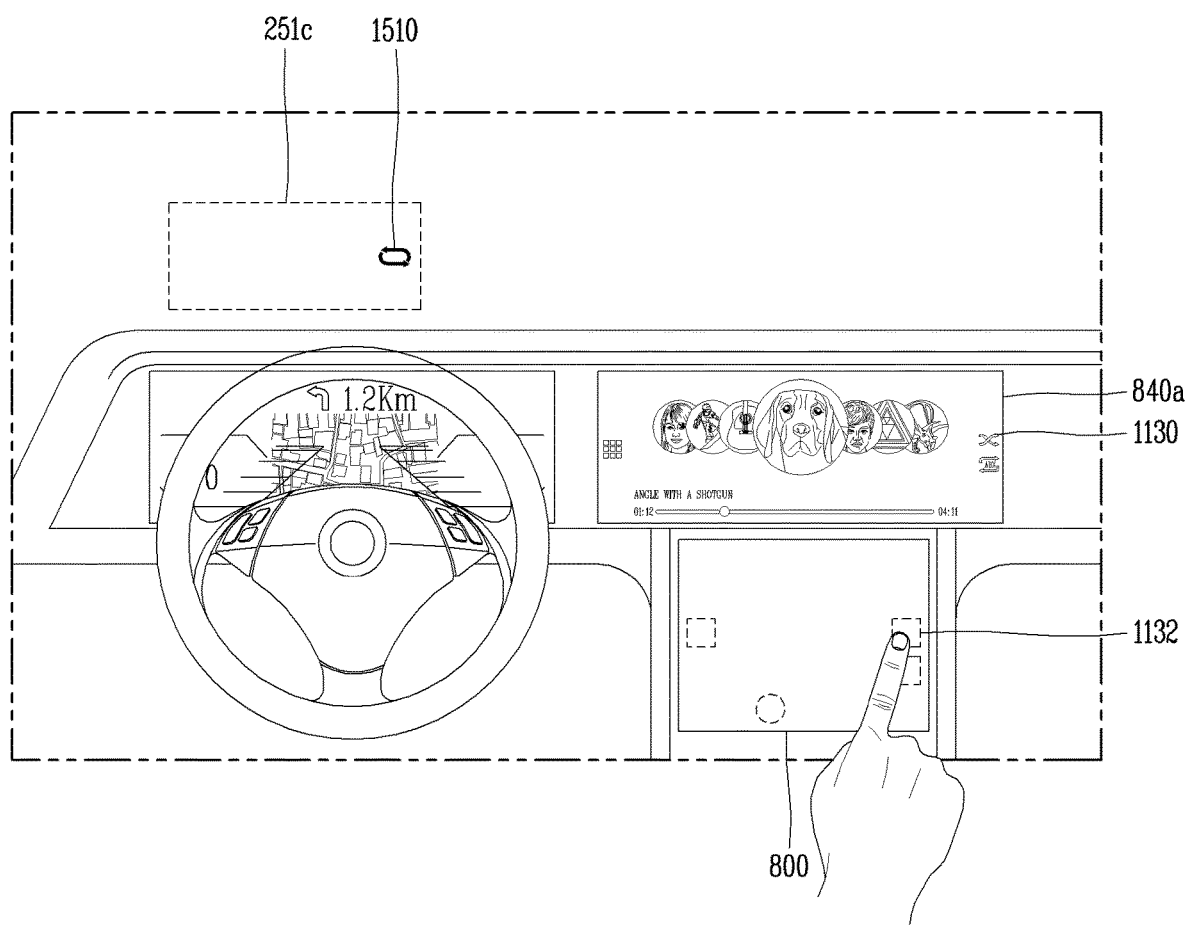
FIG. 15 is a conceptual view for explaining a method of providing visual feedback on a touch applied to an input/output device.

FIG. 15 is a conceptual view for explaining a method of providing visual feedback on a touch applied to an input/output device.

An object of the present disclosure is to provide an input/output device 800 that minimizes the risk of an accident in entering a user input to execute a predetermined function while the driver is performing driving.

To this end, the input/output device 800 is disposed adjacent to the steering wheel, and the input/output device 800 may conveniently control a plurality of displays provided in the vehicle 100 in response to a touch of the driver. In particular, when a touch is applied to the feedback region, a tactile effect is provided to perform an interaction with the driver.

However, due to the limitation of the sense of touch, precise information transmission may be a little difficult. In order to further enhance the interaction with the driver, the input/output device 800 may use a head-up display provided in the vehicle 100.

Specifically, the processor 860 extracts a graphic object corresponding to the feedback region when a touch is applied to any one of the feedback regions set on the touch panel 810. Furthermore, the processor 860 controls the communication unit 830 to display the extracted graphic object on the windshield or the transparent display panel of the vehicle 100.

As illustrated in FIG. 15, when the first display 840a located at the center fascia is selected, one or more feedback regions 840a are set on the touch panel 810 based on a screen displayed on the first display 840a.

When a touch is applied to any one feedback region 1132, the processor 860 controls the haptic module 820 to generate a tactile effect in the feedback region 1132.

Moreover, the processor 860 extracts a graphic object 1130 corresponding to the feedback region 1132 from the screen displayed on the first display 840a. The extracted graphic object 1510 is transferred to a head-up display provided in the vehicle 100, and the head-up display displays the extracted graphic object 1510. The driver may check which graphic object is assigned to the feedback region to which the touch is applied through the head-up display. As a result, the driver may check which graphic object is assigned to the feedback region being touched by himself or herself while checking the real world in the front.

When a preset touch input is applied to the feedback region 1132, a predetermined function is executed through the first display 840a, and the head-up display may display function information for guiding the predetermined function. The function information may correspond to an image or a text moving image representing a function to be executed.

Figure 16A:
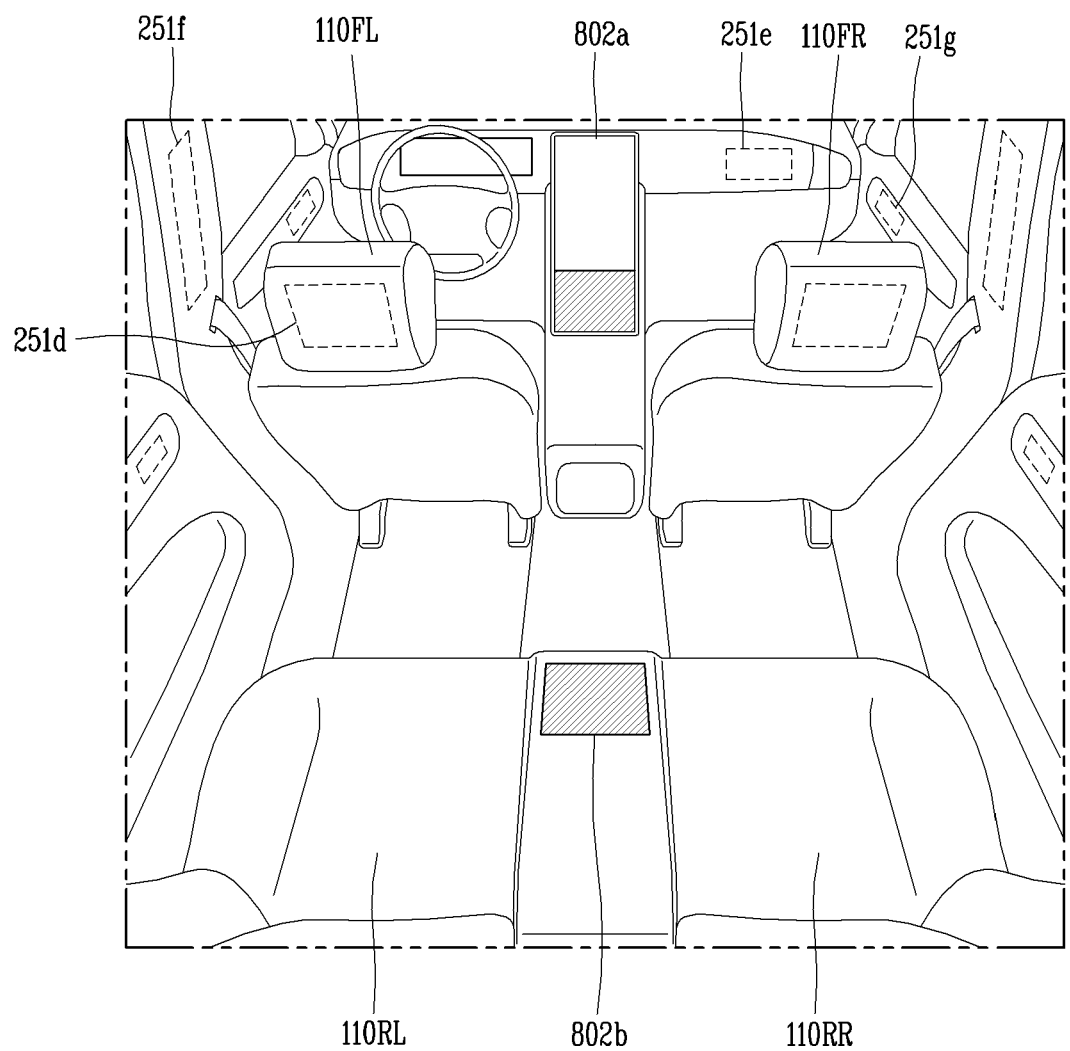
FIGS. 16A and 16B are exemplary views for explaining an example in which the input/output device is extended to a display device.
Figure 16B:
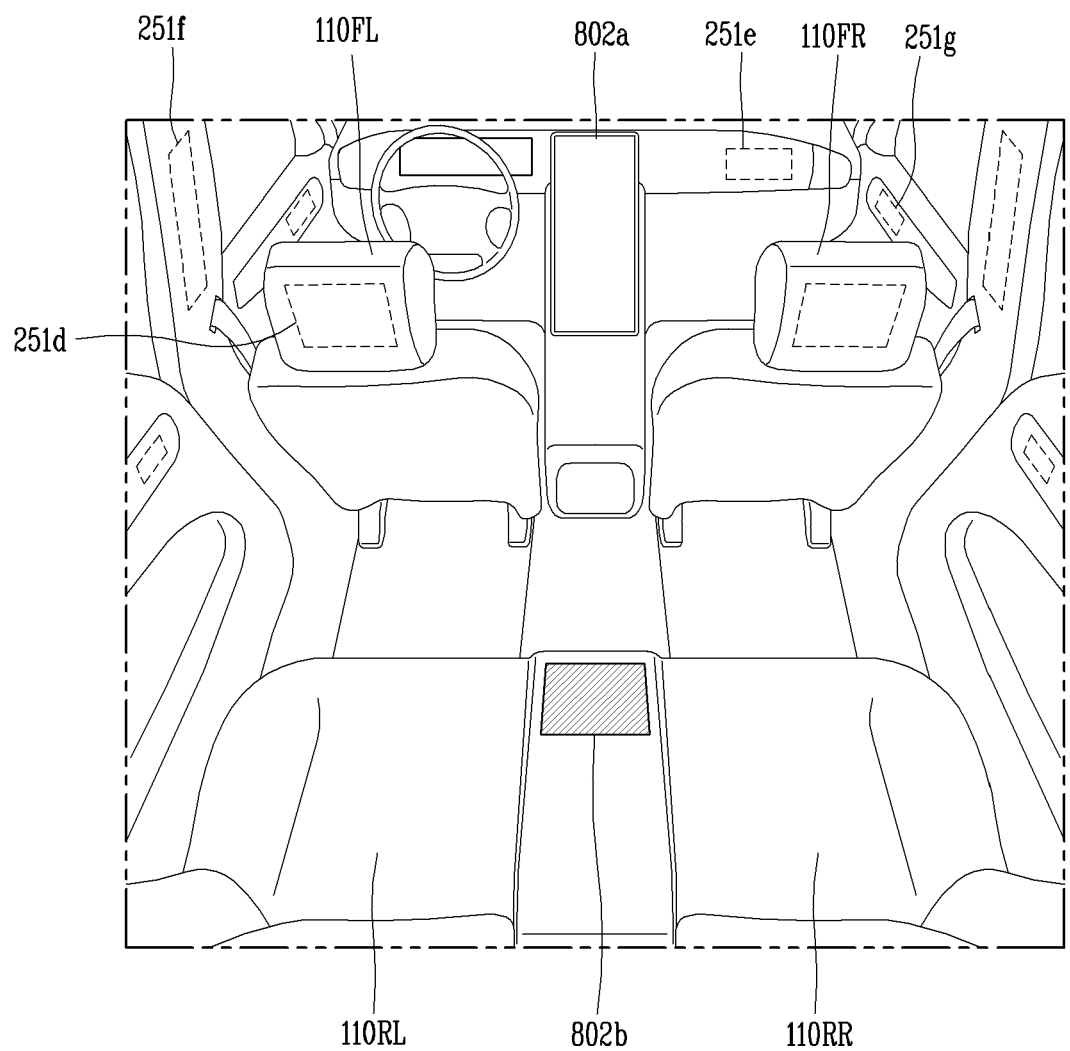

FIGS. 16A and 16B are exemplary views for explaining an example in which the input/output device 800 is extended to the display device 802. The present disclosure provides a display device 802 including the input/output device 800 as well as the input/output device 800.

As illustrated in FIG. 16A, in the display device 802, the touch panel 810 may be configured with a touch screen.

The entire region of the touch screen may be divided into a first area and a second area depending on whether the display is on or off. Specifically, a region where the display is turned on to provide various types of visual information may be defined as a first region, and a region where the display is turned off to perform the role of the touch panel 810 may be defined as a second area The first region may display an execution screen of various applications based on the vehicle driving information of the vehicle 100.

The second region may include a feedback region for any one display looked at by the passenger. The any one display may include the first region, the second region may include a feedback region based on the first region, or may include a feedback region based on another display.

The second region is an input region for receiving a touch from the driver, and corresponds to a region for providing a tactile effect corresponding to the touch. In order not to interfere with driving, the display of the second region is turned off.

Even when the display of the second region is turned on, an image with a predetermined color such as black may be displayed, thereby controlling additional information not to be displayed.

On the other hand, when the driver does not perform driving, the second region may also be turned on to display predetermined visual information. Specifically, for a case where the driver does not need to perform driving, the display of the second region is turned on to display information related to the feedback region when the vehicle 100 performs autonomous driving and/or when the vehicle 100 is parked.

For example, the processor 860 may turn on the display of the first region, turn off the display of the second region when the speed of the vehicle 100 satisfies the criteria, and set the one or more feedback regions within the second region. When the speed of the vehicle 100 does not satisfy the criteria, the one or more feedback regions disappear in the second region, and the entire region of the touch screen is turned on to provide various visual information.

In other words, the display of the touch screen may be selectively turned on or off according to the speed of the vehicle 100 and/or whether or not the vehicle 100 is in an autonomous driving mode.

The driver may use the display device 802 as a large screen or utilize the display device 802 as an input device within a range that does not interfere with driving according to circumstances.

FIGS. 16A through 16C are conceptual views illustrating a method of controlling one or more displays with one input/output device.

As described above with reference to FIG. 9, the input/output device 800 may include a first input/output device 800a configured to control a display included in the first group and a second input/output device 800b configured to control a display included in the second group.

A method of controlling one or more displays using the second input/output device 800b will be described, but the same may also be applicable to the first input/output device 800a.

The second input/output device 800b may be configured to control at least one of a first rear seat display 251d mounted on the driver's seat 110FL and a second rear seat display 251h mounted on the front passenger seat 110FR.

The processor 860 of the second input/output device 800b searches for a passenger capable of applying a touch to the touch panel 810. For example, the processor 860 may search for a passenger using an image that has captured the inside of the vehicle 100, or search for a passenger using a weight sensor provided in the seat of the vehicle 100.

When one passenger is retrieved, the processor 860 sets a feedback region for the passenger. Specifically, the processor 860 selects any one of displays included in the second group based on the boarding position of the passenger, and sets a feedback region based on a screen displayed on the selected display.

For example, the first rear seat display 251d may be selected when a passenger gets on the rear side of the driver's seat 110FL, and the second rear seat display 251h may be selected when a passenger gets on the rear side of the front passenger seat 110FR.

When a plurality of passengers are retrieved, the processor 860 may track a hand entering a virtual region set based on the touch panel 810, and set a feedback region based on the tracked hand.

Figure 17A:
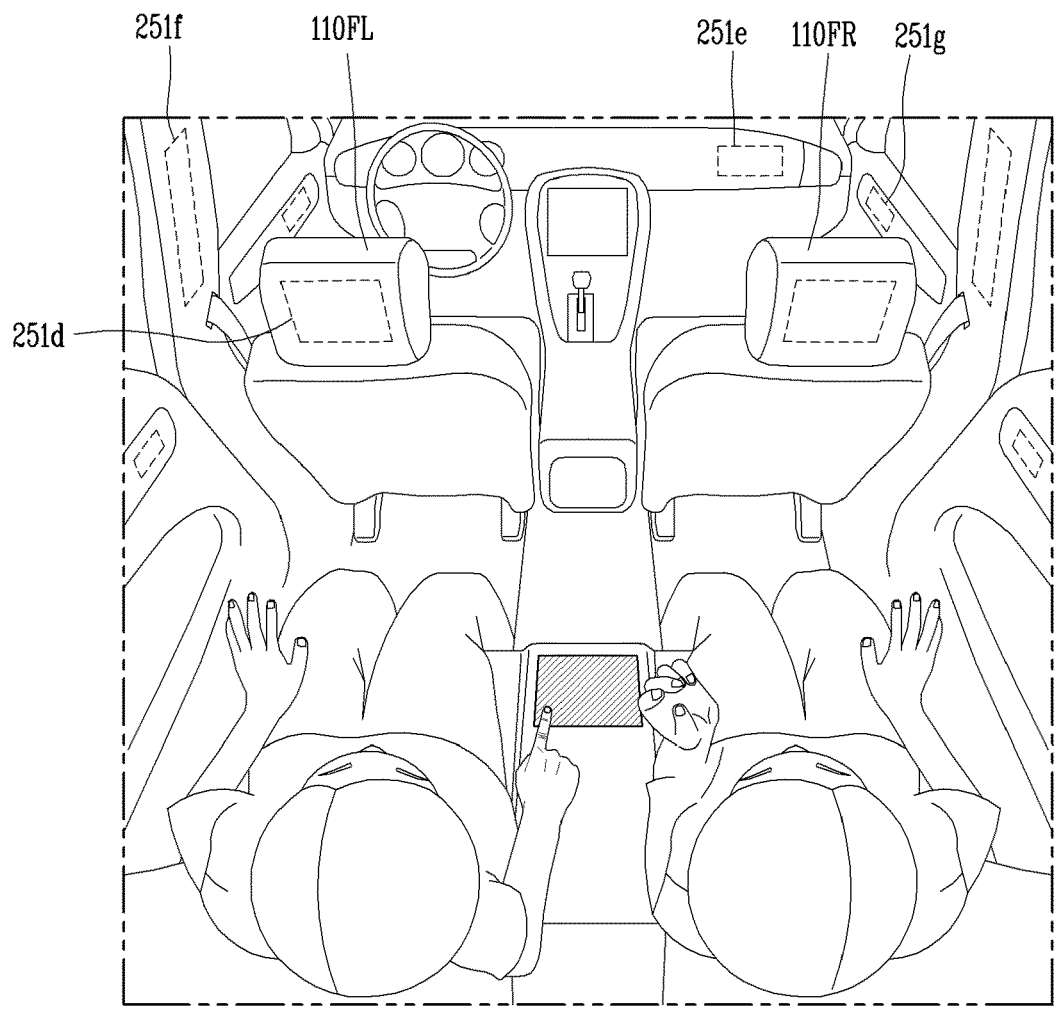
FIGS. 17A through 17C are conceptual views illustrating a method of controlling one or more displays with one input/output device.
Figure 17A:
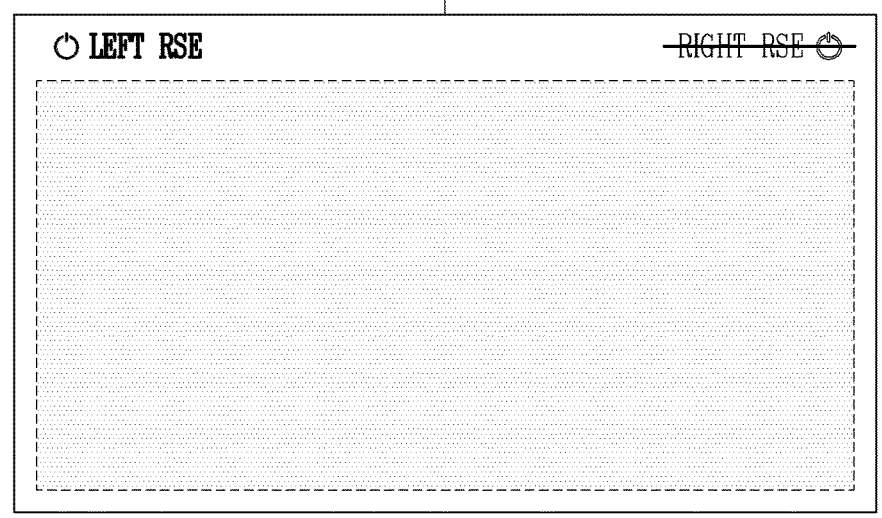

For example, as illustrated in FIG. 17A, a first passenger may get on the rear side of the driver's seat 110FL, and a second passenger may get on the rear side of the front passenger seat 110FR.

When the hand of the first passenger enters the virtual region, the processor 860 sets a feedback region based on the first rear seat display 251d used by the first passenger. In other words, the input/output device 800 operates as an input device of the first rear seat display 251d for the first passenger.

Figure 17B:
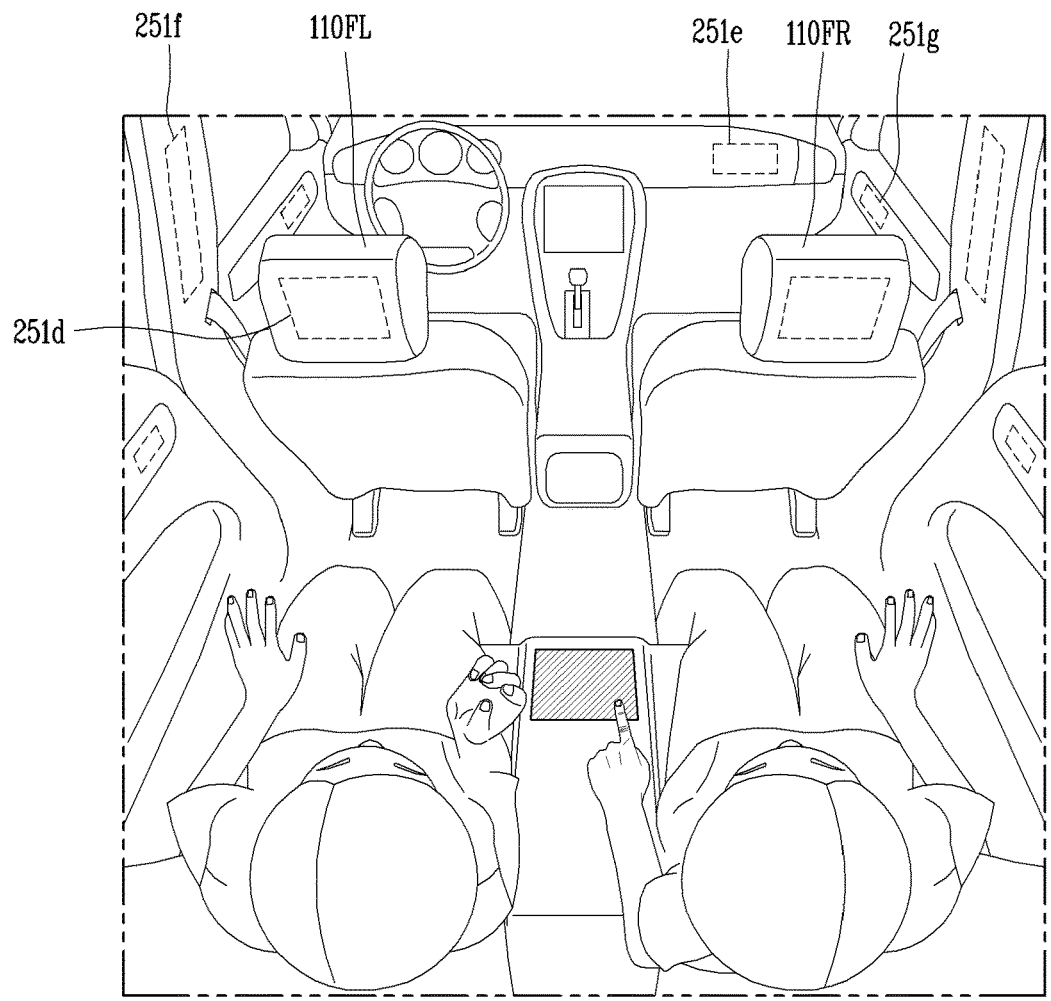
Figure 17B:
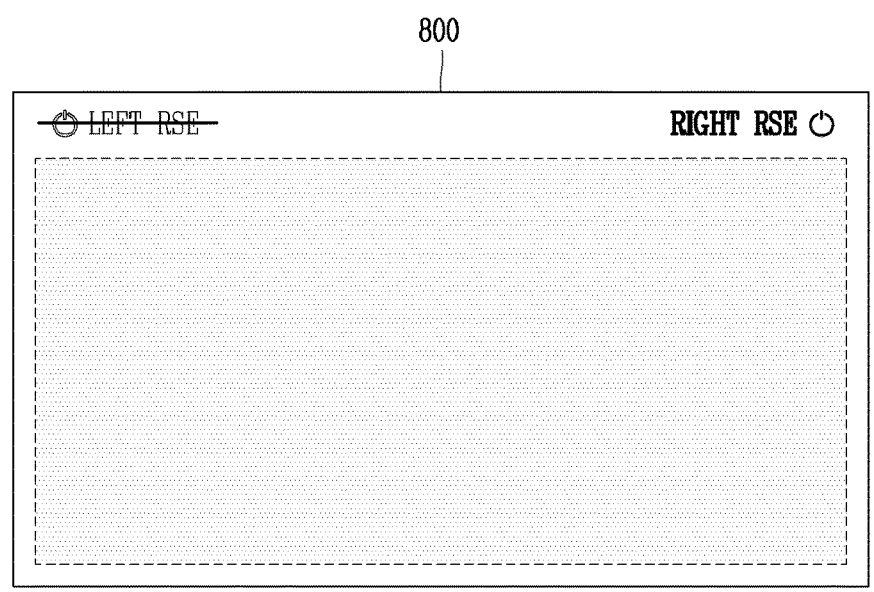

On the contrary, as illustrated in FIG. 17B, when the hand of the second passenger enters the virtual region, the processor 860 sets a feedback region based on the second rear seat display 251h used by the second passenger. In other words, the input/output device 800 operates as an input device of the second rear seat display 251h for the second passenger.

Figure 17C:
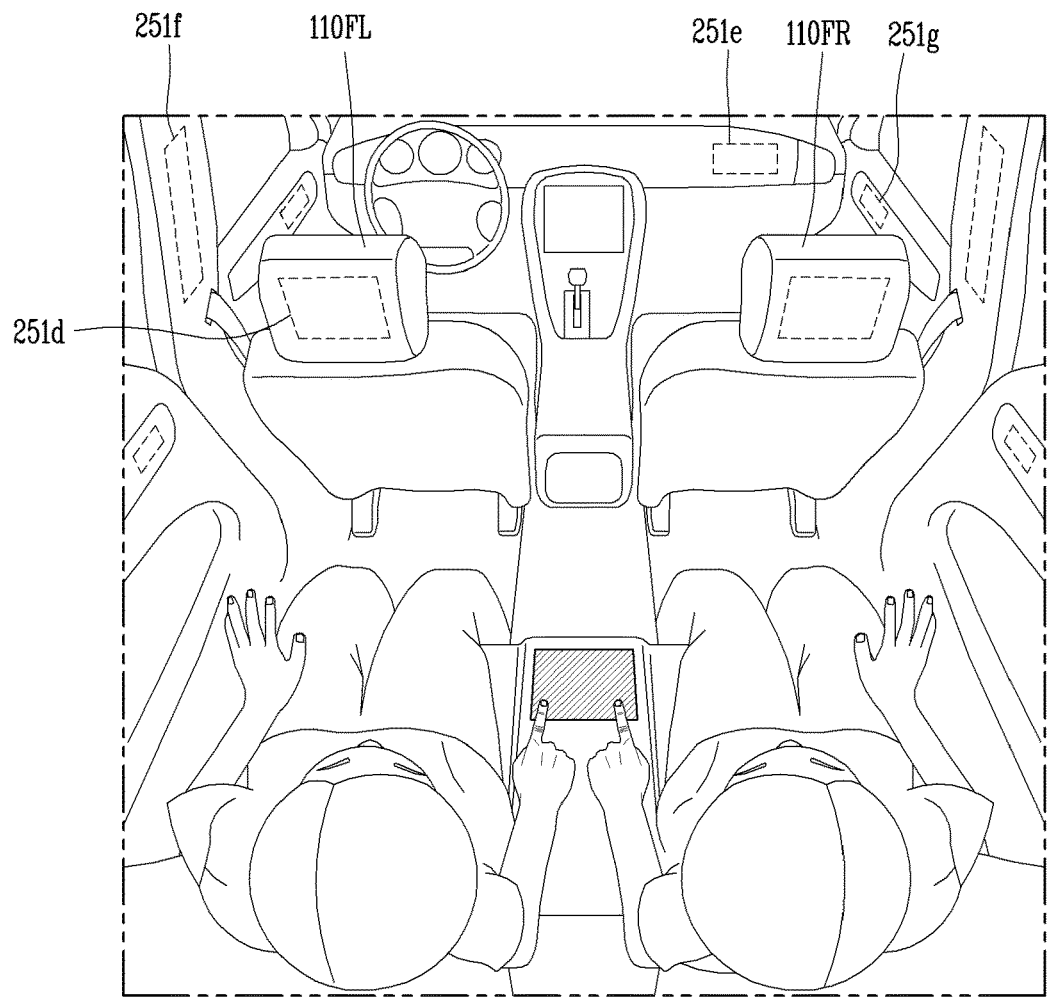
Figure 17C:
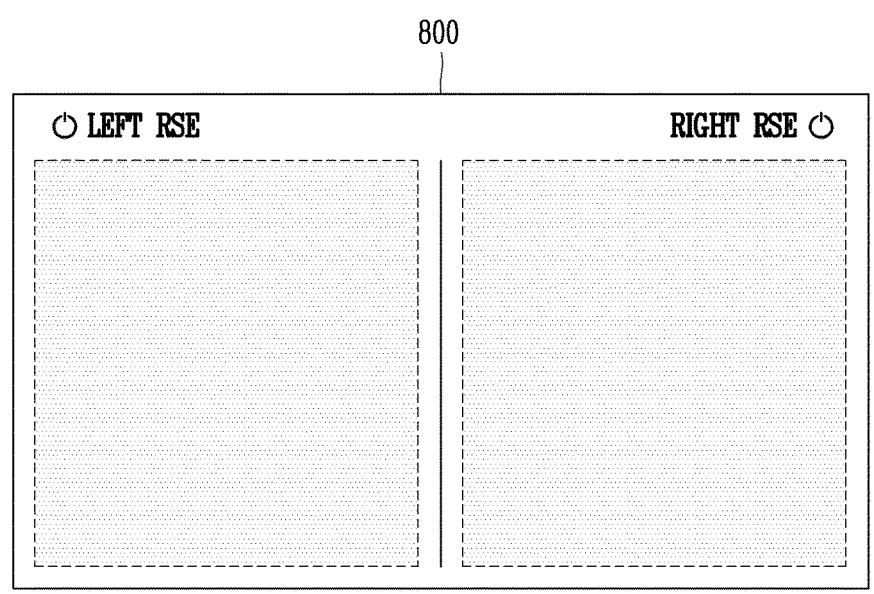

Meanwhile, as illustrated in FIG. 17C, the hand of the first passenger and the hand of the second passenger may simultaneously enter the virtual region. In this case, the processor 860 divides the touch panel 810 into a first region for the first passenger and a second region for the second passenger. A feedback region is set in the first region based on a screen displayed on the first rear seat display 251*d* and a feedback region is set in the second region based on a screen displayed on the second rear seat display 251*h*. The first passenger may apply a touch to the first region to control the first rear seat display 251*d* looked at by himself or herself.

In the vehicle 100 of the related art, buttons capable of uniquely adjusting each seat have to be separately mounted, but when the input/output device 800 according to the present disclosure is mounted on the vehicle 100, the buttons may disappear. This results in new effects of cost reduction and space reservation.

The foregoing present disclosure may be implemented as codes (application or software) readable by a computer on a medium written by the program. The control method of the above-described autonomous vehicle may be implemented by codes stored in a memory or the like.

The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. An input/output device mounted on a vehicle comprising a plurality of displays, the input/output device comprising:
   a touch panel configured to sense touch input;
   a haptic module configured to generate a tactile effect on the touch panel;
   a communication unit configured to perform communication with the plurality of displays of the vehicle;
   at least one processor; and
   a computer-readable medium coupled to the at least one processor having stored thereon instructions which, when executed by the at least one processor, causes the at least one processor to perform operations comprising:
      varying one or more feedback regions on a surface of the touch panel by setting the one or more feedback regions based on a content being displayed on at least one of the plurality of displays;
      receiving, through the touch panel, a first touch input at the one or more feedback regions of the touch panel;
      generating, through the haptic module, a tactile effect in response to receipt of the first touch input;
      receiving, through the communication unit, one or more images captured by one or more cameras of the vehicle;
      determining which passenger of the vehicle is applying a touch input to the touch panel;
      based on the one or more images, determining a third display of the plurality of displays being viewed by the determined passenger; and
      varying the one or more feedback regions by setting the one or more feedback regions based on a content being displayed on the determined third display.

2. The input/output device of claim 1, wherein the operations comprise:
   determining that the first touch input is a preset touch input; and
   based on the determination that the first touch input is the preset touch input, executing a function associated with the preset touch input.

3. The input/output device of claim 2, wherein the preset touch input comprises at least one of a force touch or a double touch.

4. The input/output device of claim 2, wherein executing the function associated with the preset touch input comprises:
   determining the function based on the feedback region through which the first touch input is received.

5. The input/output device of claim 4, wherein the content being displayed on the at least one of the plurality of displays comprises one or more graphic objects that provide an interface for user input, and
   wherein varying the one or more feedback regions comprises:
      setting the one or more feedback regions in correspondence to the one or more graphic objects of the content being displayed.

6. The input/output device of claim 5, wherein the one or more graphic objects comprises a first graphic object associated with a first function and a second graphic object associated with a second function,
   wherein the one or more feedback regions comprise a first feedback region corresponding to the first graphic object and a second feedback region corresponding to the second graphic object, and
   wherein executing the function associated with the preset touch input comprises:
      based on a determination that the first touch input is received through the first feedback region, executing the first function.

7. The input/output device of claim 6, wherein the operations comprise:
   determining that the first touch input is a simple touch input different from the preset touch input; and
   based on the determination that the first touch input is the simple touch input, instructing, through the communication unit, the at least one of the plurality of displays to display notification information configured to indicate a selection of the first graphic object.

8. The input/output device of claim 5, wherein varying the one or more feedback regions comprises:
   determining positions and sizes of the one or more graphic objects; and
   setting positions and sizes of the one or more feedback regions corresponding to the one or more graphic objects based on the determined positions and sizes of the one or more graphic objects.

9. The input/output device of claim 1, wherein generating, through the haptic module, the tactile effect in response to receipt of the first touch input comprises:
   determining whether the first touch input is received through a first feedback region or a second feedback region;
   based on a determination that the first touch input is received through the first feedback region, generating a first tactile effect; and based on a determination that the first touch input is received through the second feedback region, generating a second tactile effect different from the first tactile effect.

10. The input/output device of claim 1, wherein generating, through the haptic module, the tactile effect in response to receipt of the first touch input comprises:
generating a local tactile effect on the feedback region through which the first touch input is received.

11. The input/output device of claim 10, wherein generating, through the haptic module, the tactile effect in response to receipt of the first touch input comprises:
determining whether the first touch input is received through a first feedback region or a second feedback region;
based on a determination that the first touch input is received through the first feedback region, generating a first local tactile effect localized to the first feedback region; and
based on a determination that the first touch input is received through the second feedback region, generating a second local tactile effect localized to the second feedback region.

12. The input/output device of claim 1, wherein the operations comprise:
receiving, through the communication unit, a first image of a passenger of the vehicle captured by a camera of the vehicle; and
based on the first image, determining a first display of the plurality of displays being viewed by the passenger of the vehicle, and
wherein varying the one or more feedback regions comprises:
setting the one or more feedback regions based on a content being displayed on the determined first display.

13. The input/output device of claim 12, wherein the operations comprise:
receiving, through the communication unit, a second image of the passenger of the vehicle;
based on the second image, determining that the passenger is viewing a second display of the plurality of displays different from the first display; and
based on the determination that the passenger is viewing the second display of the plurality of displays different from the first display, varying the one or more feedback regions by setting the one or more feedback regions based on a content being displayed on the second display.

14. The input/output device of claim 13, wherein the operations comprise:
based on a determination that the passenger is viewing the first display of the plurality of displays, instructing, through the communication unit, the first display to display a guide information configured to indicate the display currently being viewed by the passenger.

15. The input/output device of claim 14, wherein the operations comprise:
based on the determination that the passenger is viewing the second display of the plurality of displays different from the first display, instructing, through the communication unit, the first display to remove the guide information and the second display to display the guide information configured to indicate the display currently being viewed by the passenger.

16. The input/output device of claim 12, wherein the operations comprise:

receiving, through the communication unit, a second image of the passenger of the vehicle;
determining that (i) the passenger is viewing a second display of the plurality of displays different from the first display based on the second image, and (ii) touch input is being applied to the touch panel; and
based on the determination that (i) the passenger is viewing the second display of the plurality of displays different from the first display based on the second image, and (ii) touch input is being applied to the touch panel, maintaining the one or more feedback regions set based on the content being displayed on the first display.

17. The input/output device of claim 1, further comprising a touch screen comprising the touch panel and a display panel, and
wherein the operations comprise:
turning on or off the display panel of the touch screen based on a speed of the vehicle.

18. An input/output device mounted on a vehicle comprising a plurality of displays, the input/output device comprising:
a touch screen comprising:
a touch panel configured to sense touch input and
a display panel;
a haptic module configured to generate a tactile effect on the touch panel;
a communication unit configured to perform communication with the plurality of displays of the vehicle;
at least one processor; and
a computer-readable medium coupled to the at least one processor having stored thereon instructions which, when executed by the at least one processor, causes the at least one processor to perform operations comprising:
varying one or more feedback regions on a surface of the touch panel by setting the one or more feedback regions based on a content being displayed on at least one of the plurality of displays;
receiving, through the touch panel, a first touch input at the one or more feedback regions of the touch panel; and
generating, through the haptic module, a tactile effect in response to receipt of the first touch input,
wherein the touch screen comprises a first region and a second region, and
wherein the operations further comprise:
determining that a speed of the vehicle is within a reference range; and
based on the determination that the speed of the vehicle is within the reference range, turning on the first region, turning off the second region, and setting the one or more feedback regions within the second region.

19. A display device, comprising:
a camera;
a plurality of displays;
a touch panel configured to sense touch input;
a haptic module configured to generate a tactile effect on the touch panel;
at least one processor; and
a computer-readable medium coupled to the at least one processor having stored thereon instructions which, when executed by the at least one processor, causes the at least one processor to perform operations comprising:

obtaining, from the camera, a first image of a passenger;
based on the first image, determining a first display of the plurality of displays being viewed by the passenger;
varying one or more feedback regions on a surface of the touch panel by setting the one or more feedback regions based on a content being displayed on the determined first display;
generating, through the haptic module, a tactile effect in response to receipt of a first touch input through the one or more feedback regions;
obtaining, from the camera, one or more images;
determining which passenger is applying a touch input to the touch panel;
based on the one or more images, determining a second display of the plurality of displays being viewed by the determined passenger; and
varying the one or more feedback regions by setting the one or more feedback regions based on a content being displayed on the determined second display.

* * * * *